Figure 1:
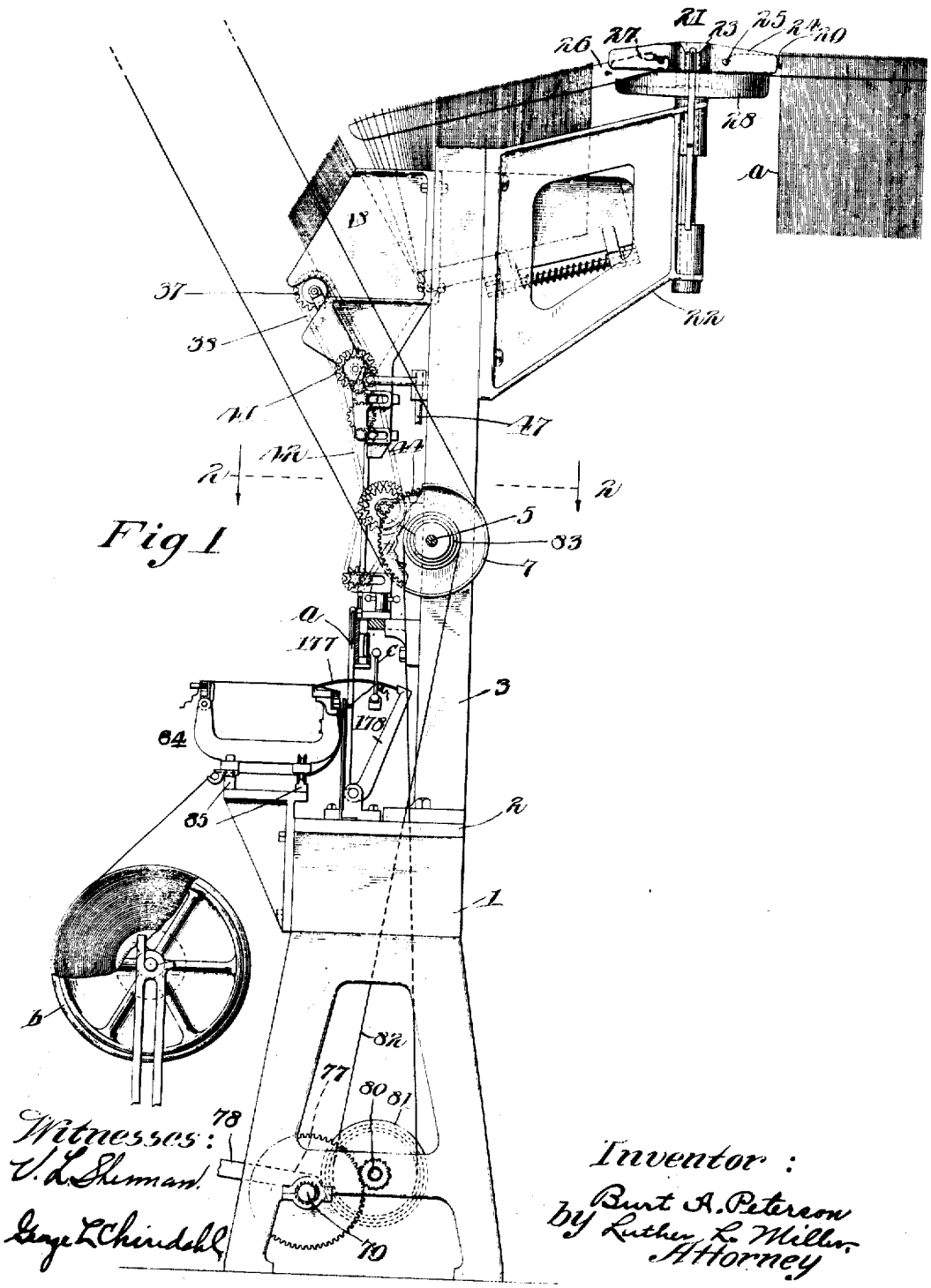

B. A. PETERSON.
WARP DRAWING MACHINE.
APPLICATION FILED OCT. 28, 1907.

1,190,245.

Patented July 4, 1916.
20 SHEETS—SHEET 2.

Witnesses:
V. L. Sherman.
George L. Chindahl.

Inventor
B. A. Peterson
by Luther L. Miller
Attorney

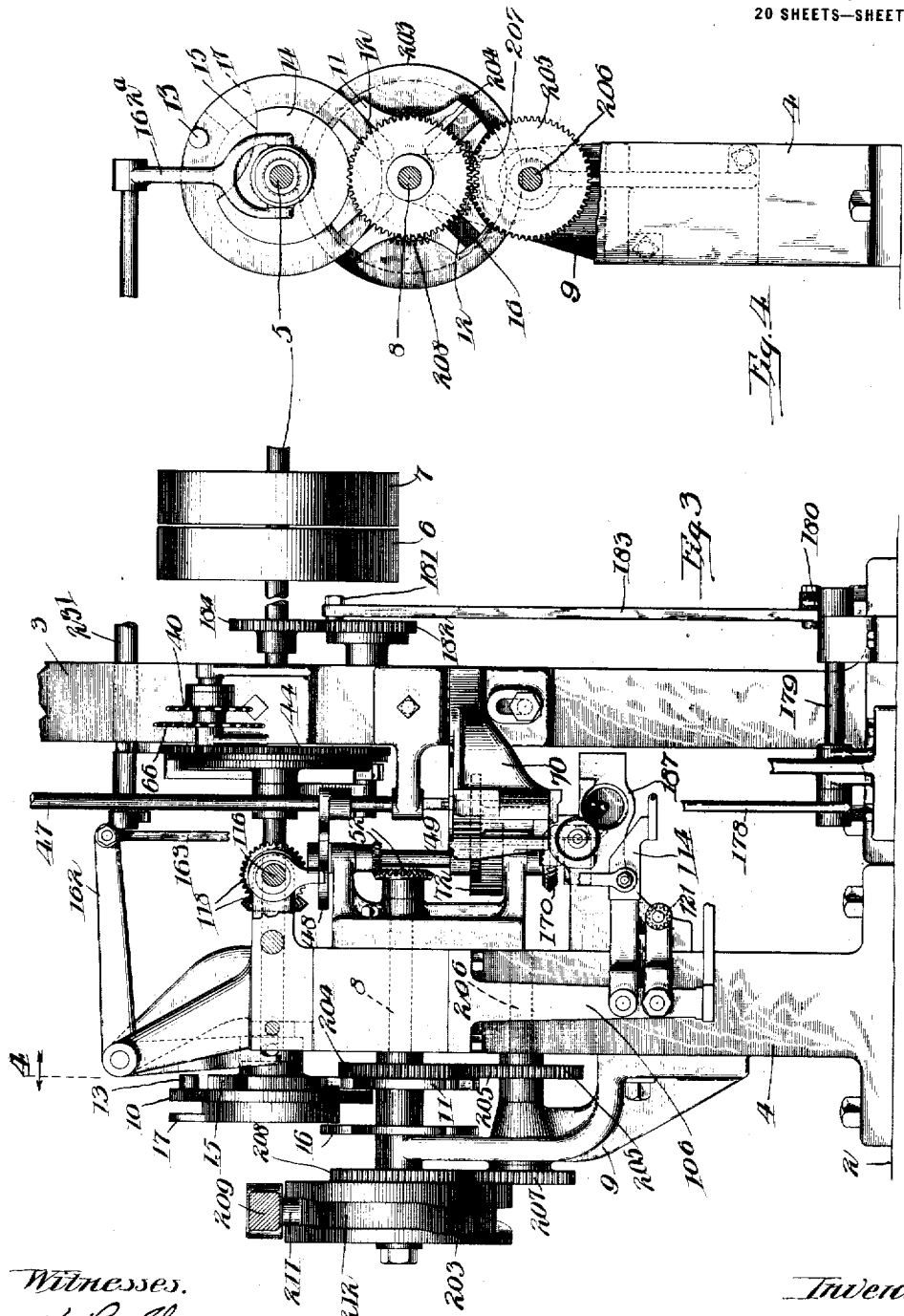

B. A. PETERSON.
WARP DRAWING MACHINE.
APPLICATION FILED OCT. 28, 1907.

1,190,245.

Patented July 4, 1916.
20 SHEETS—SHEET 4.

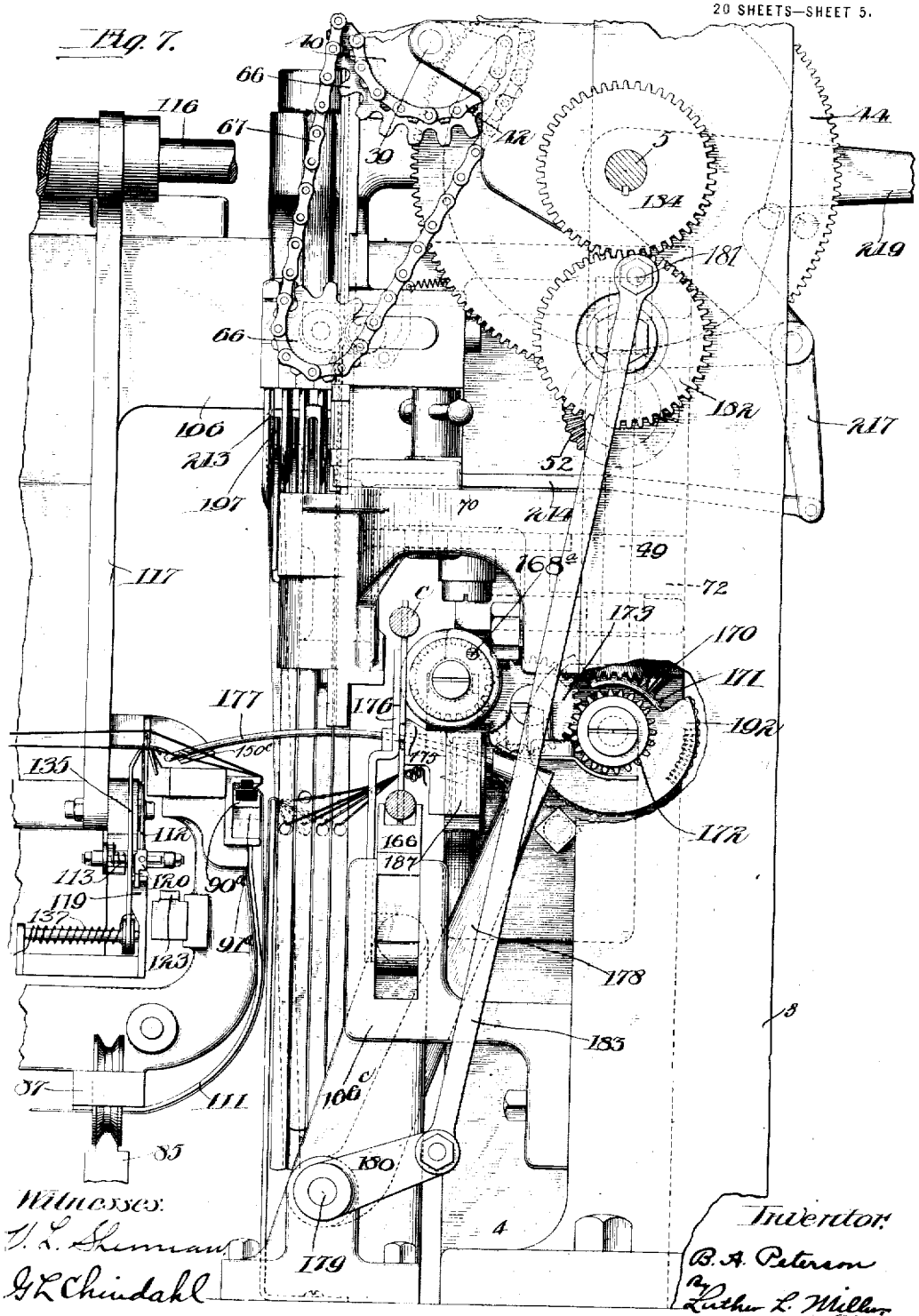

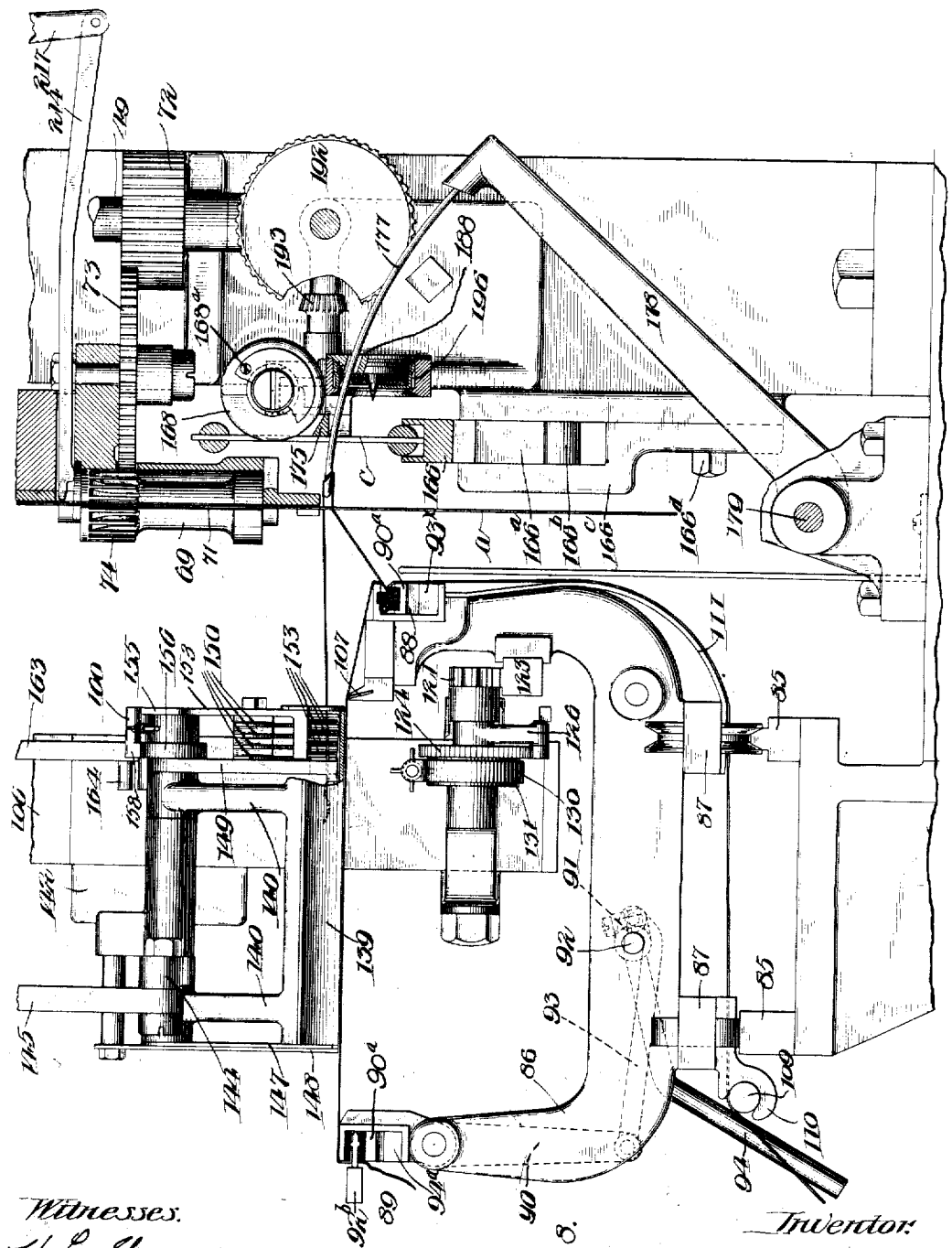

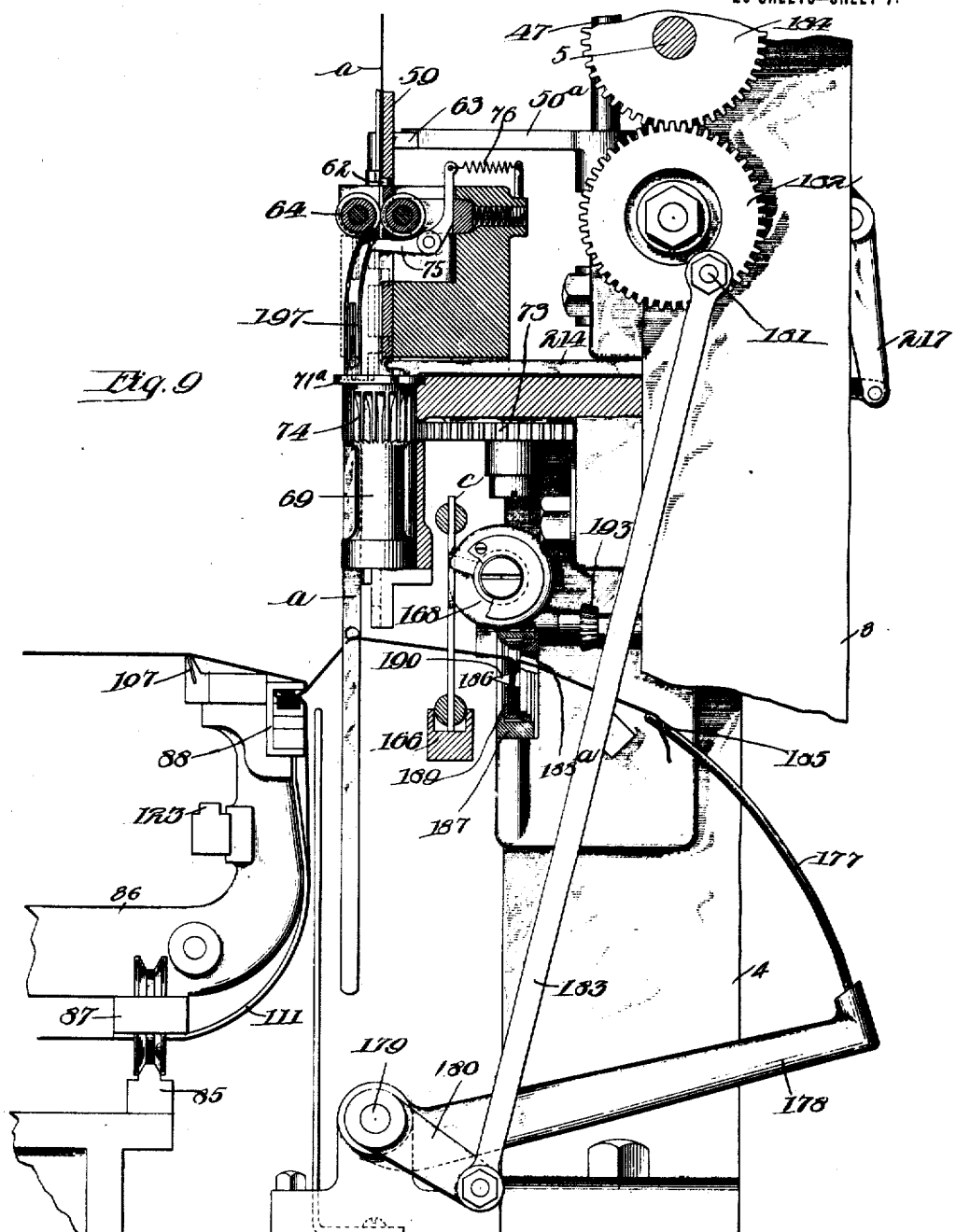

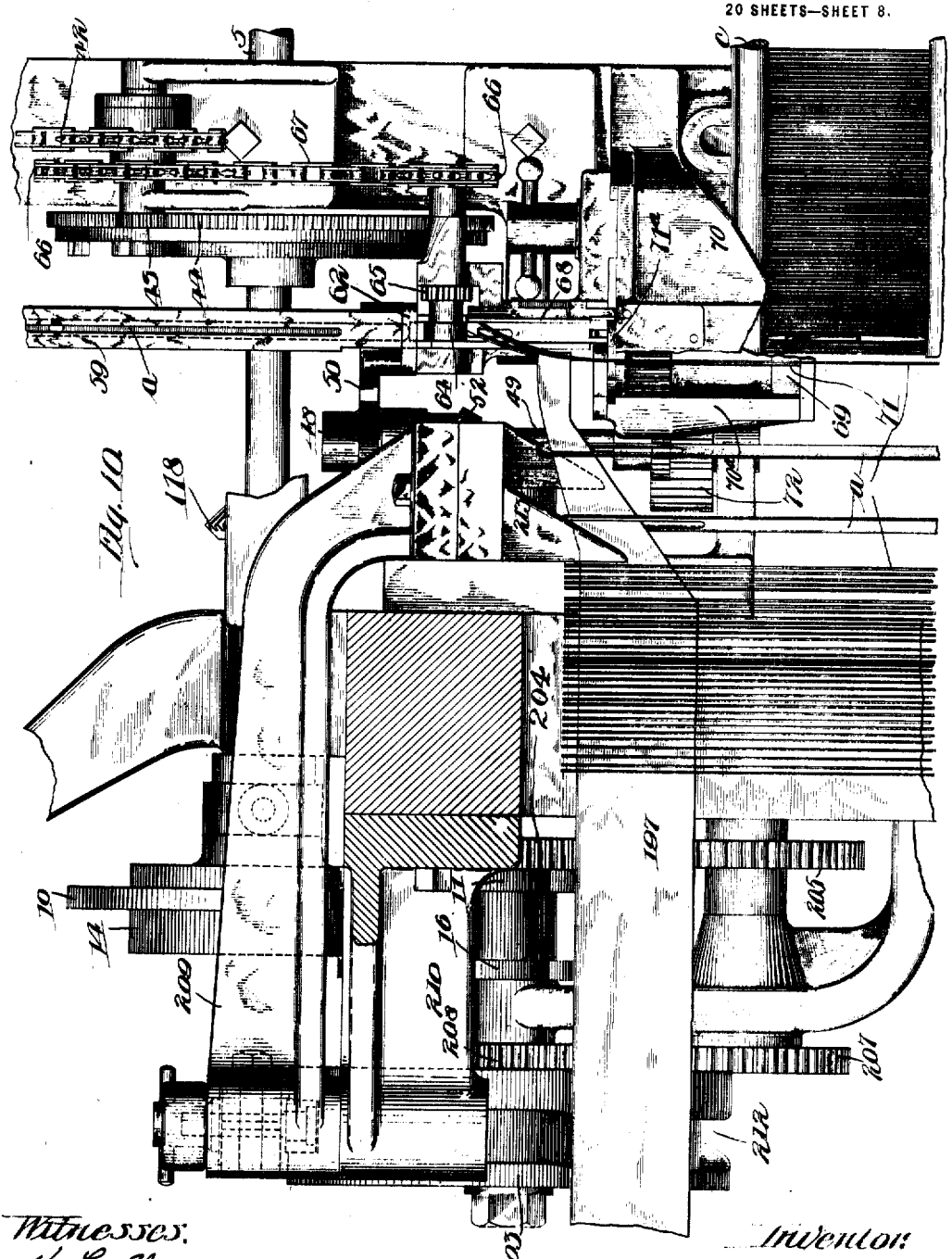

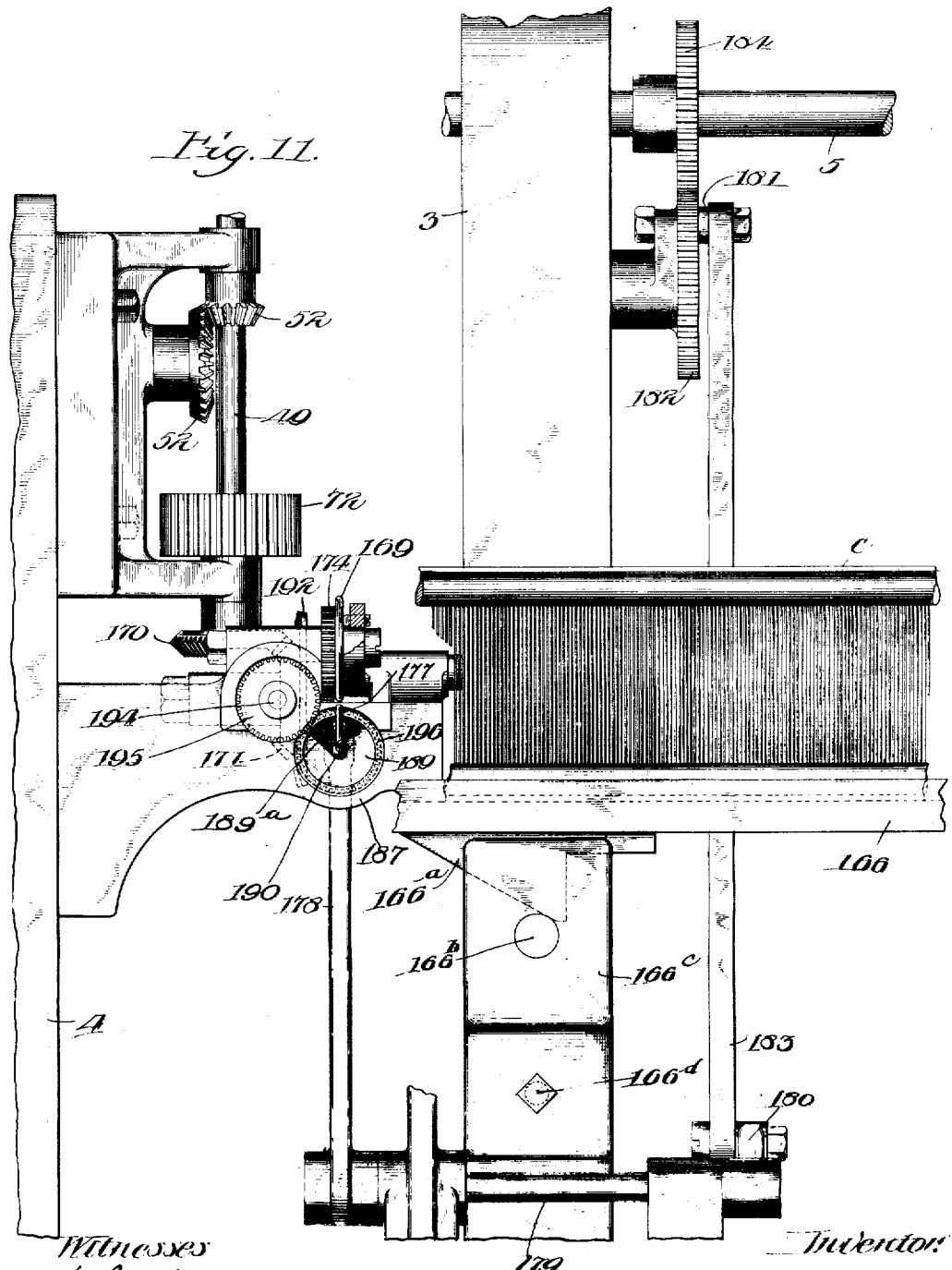

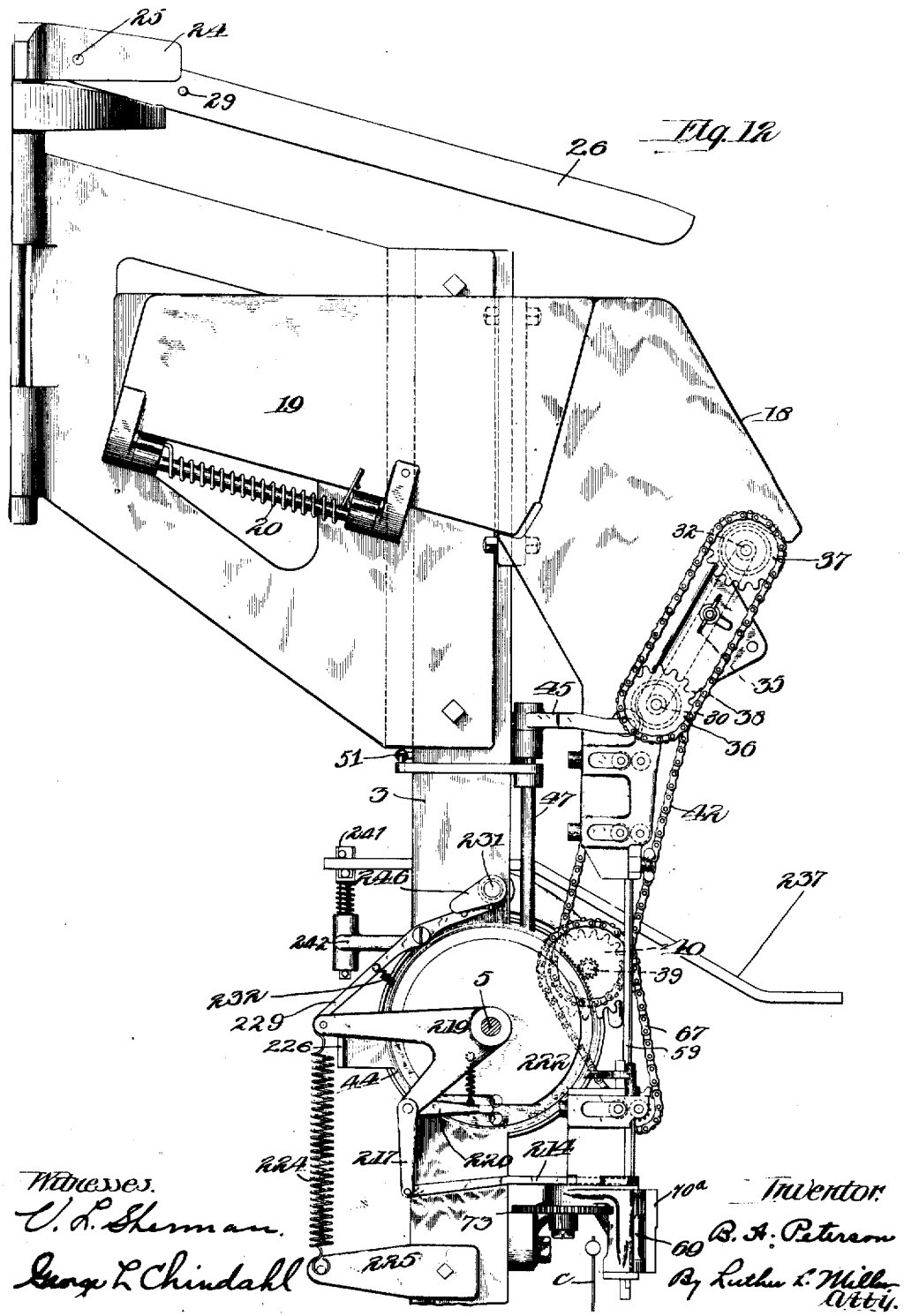

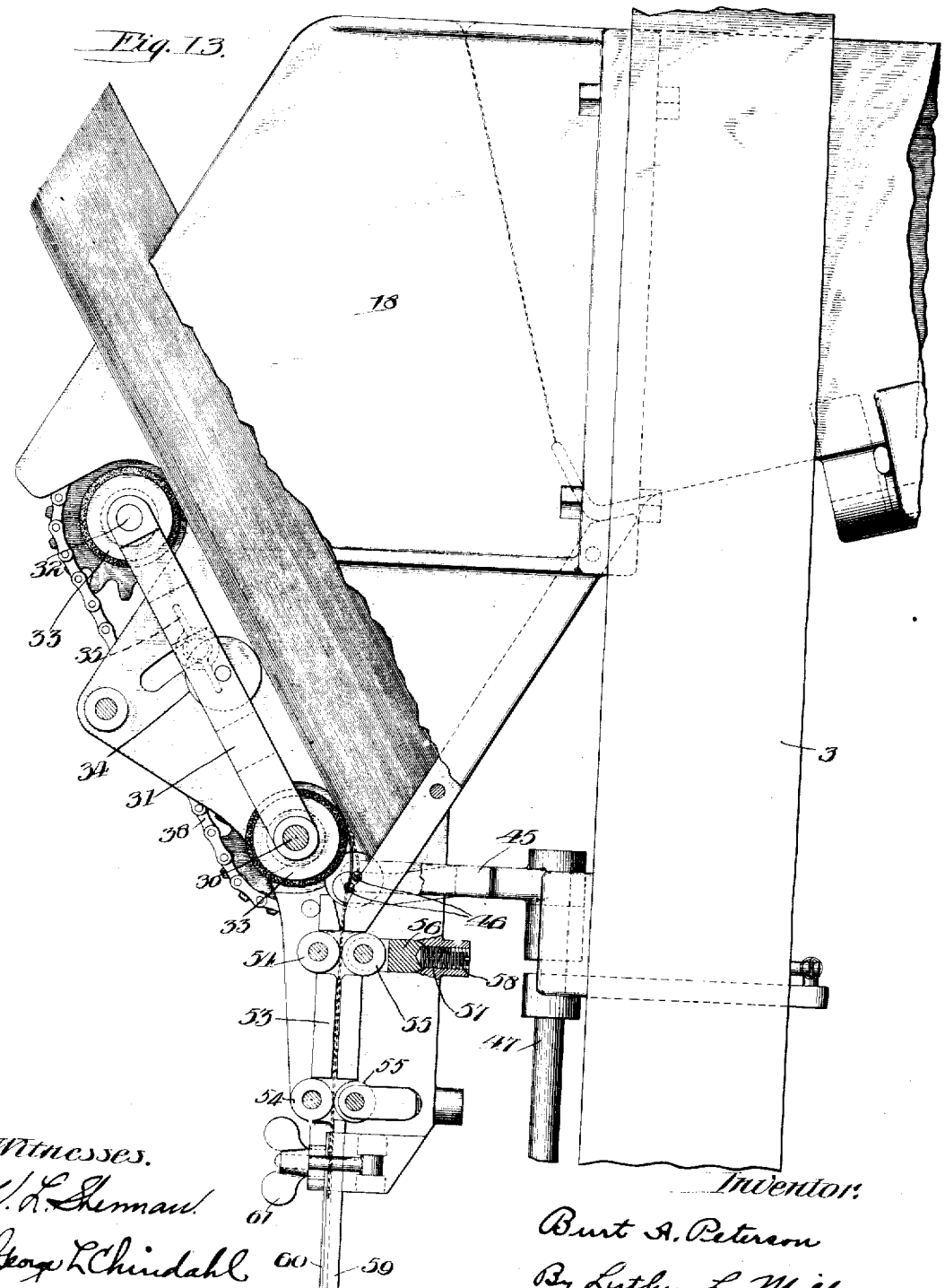

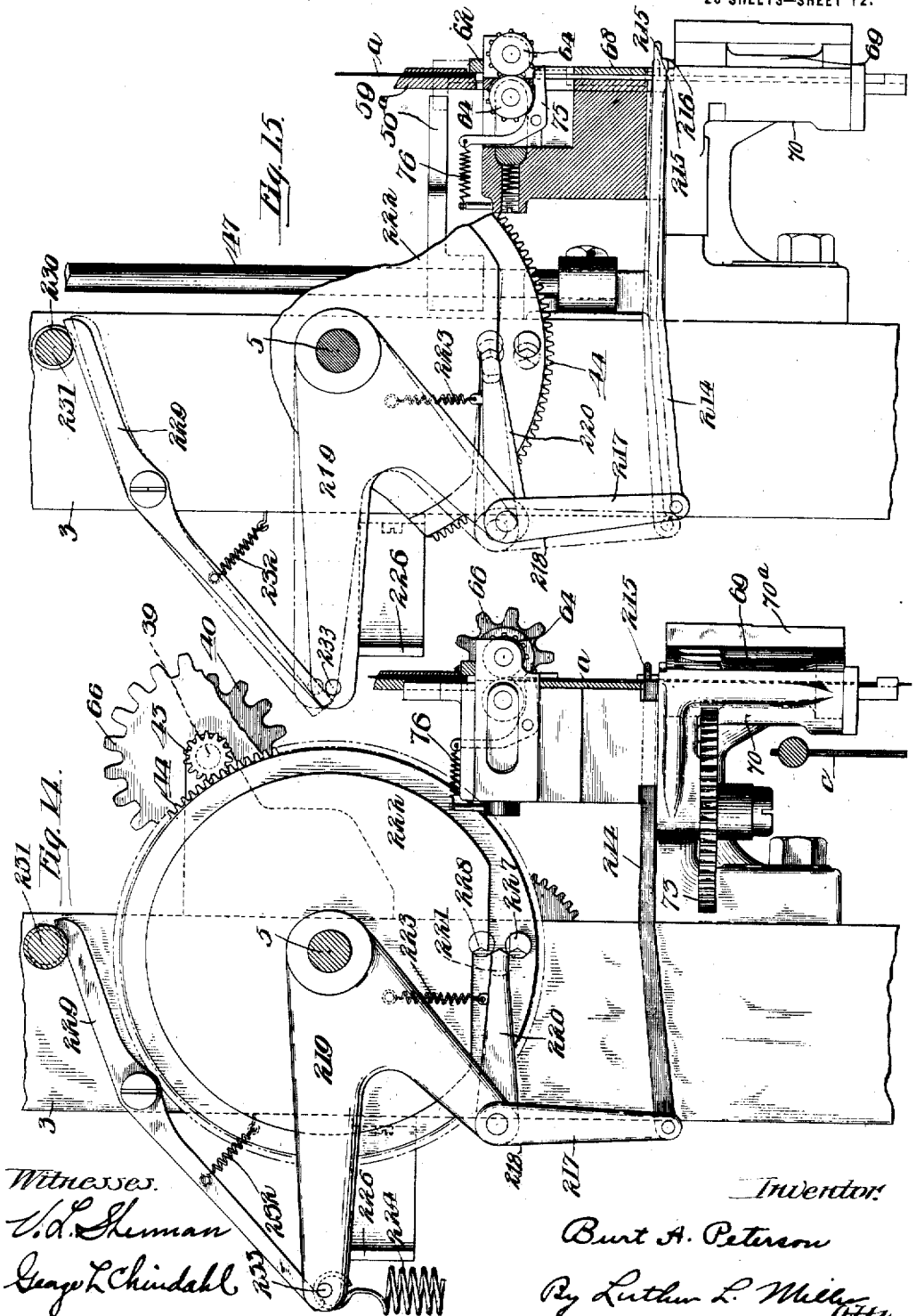

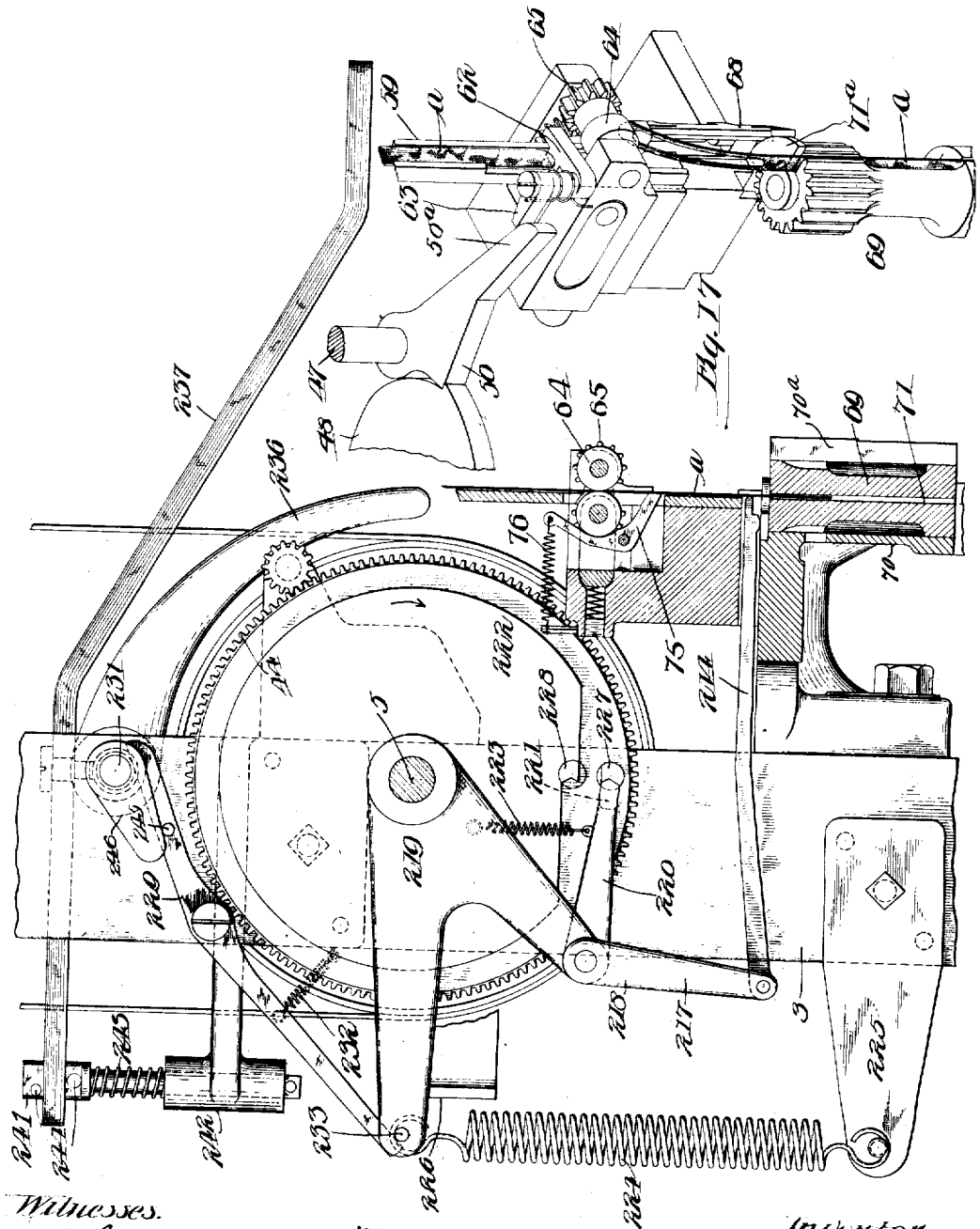

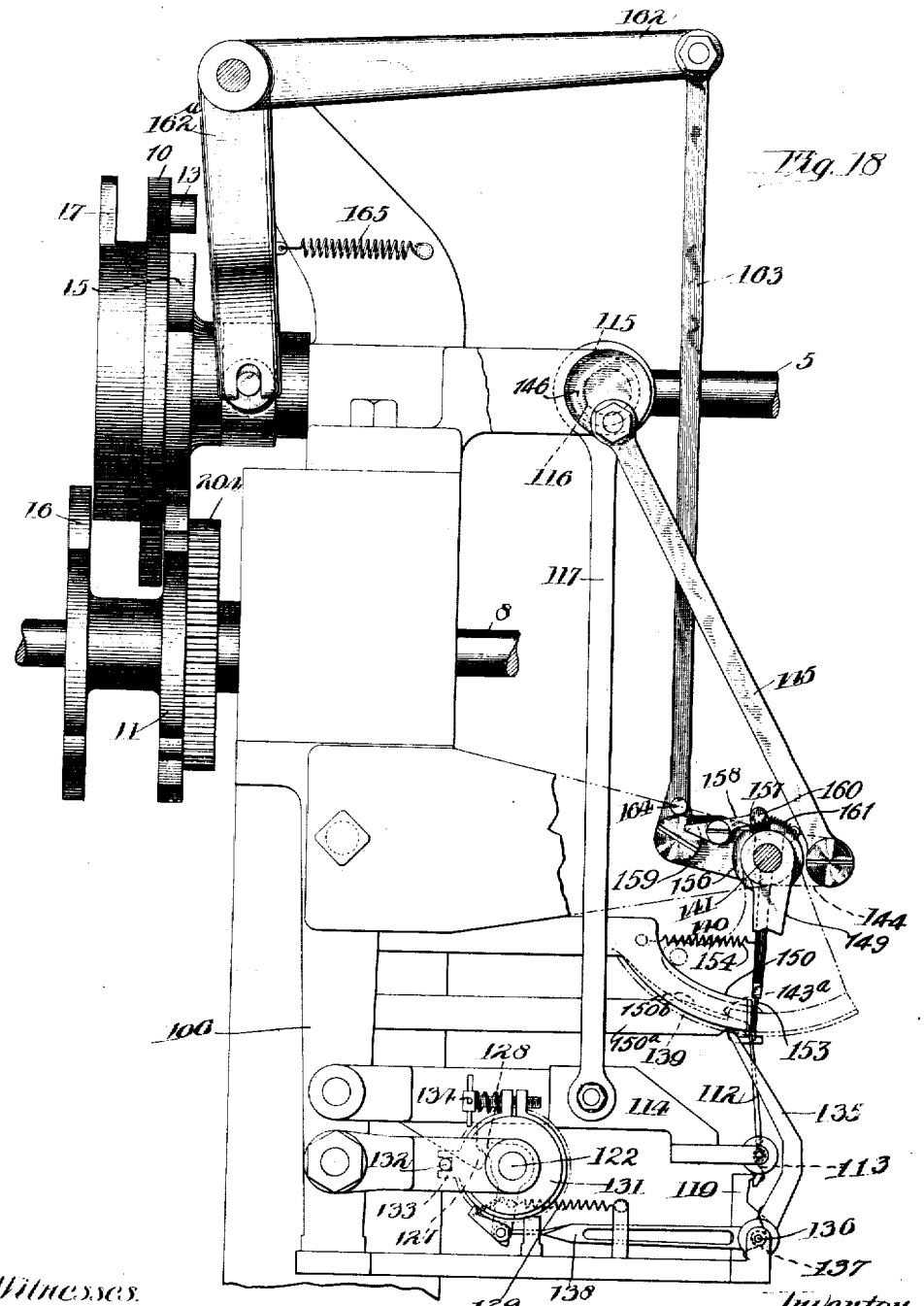

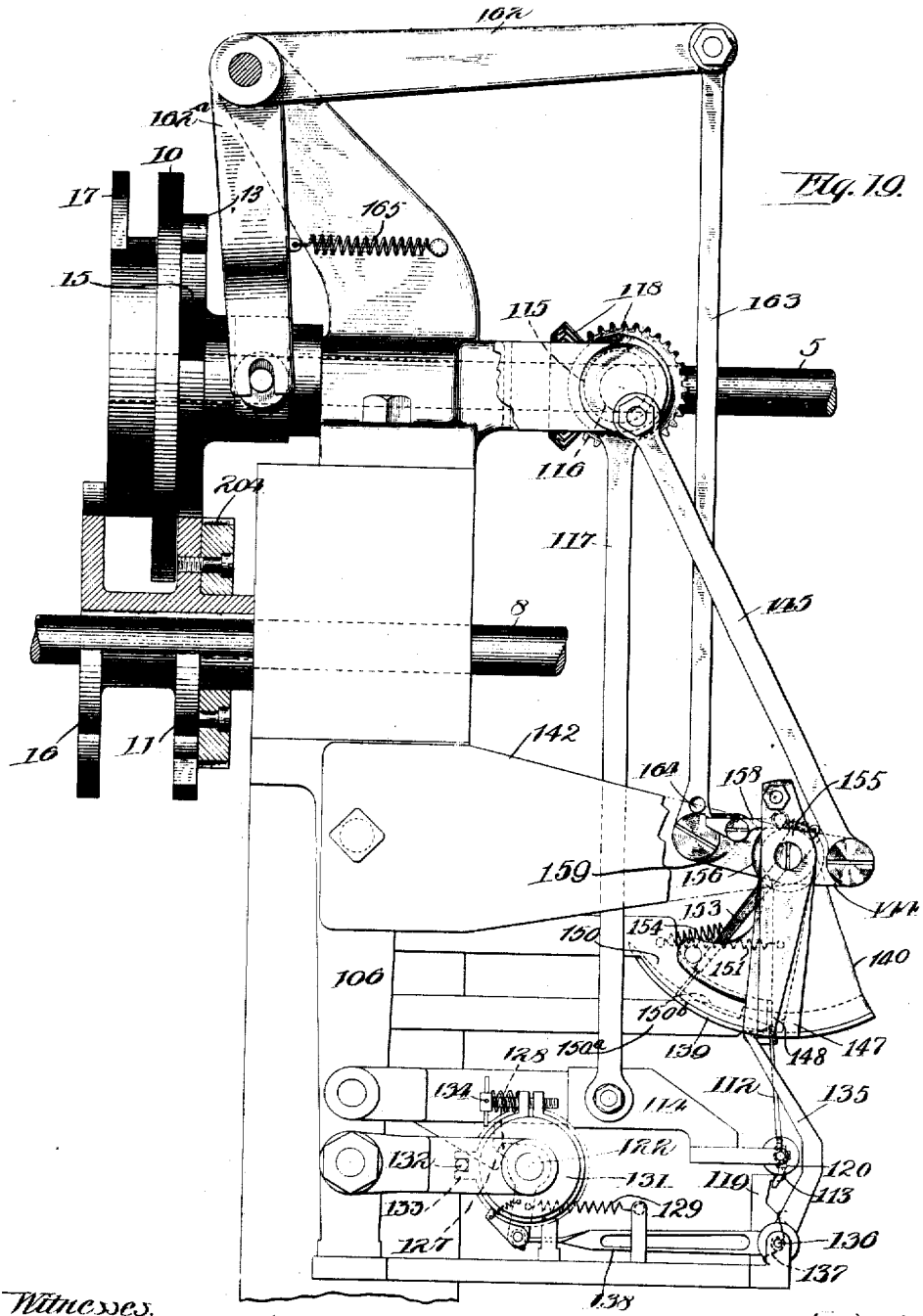

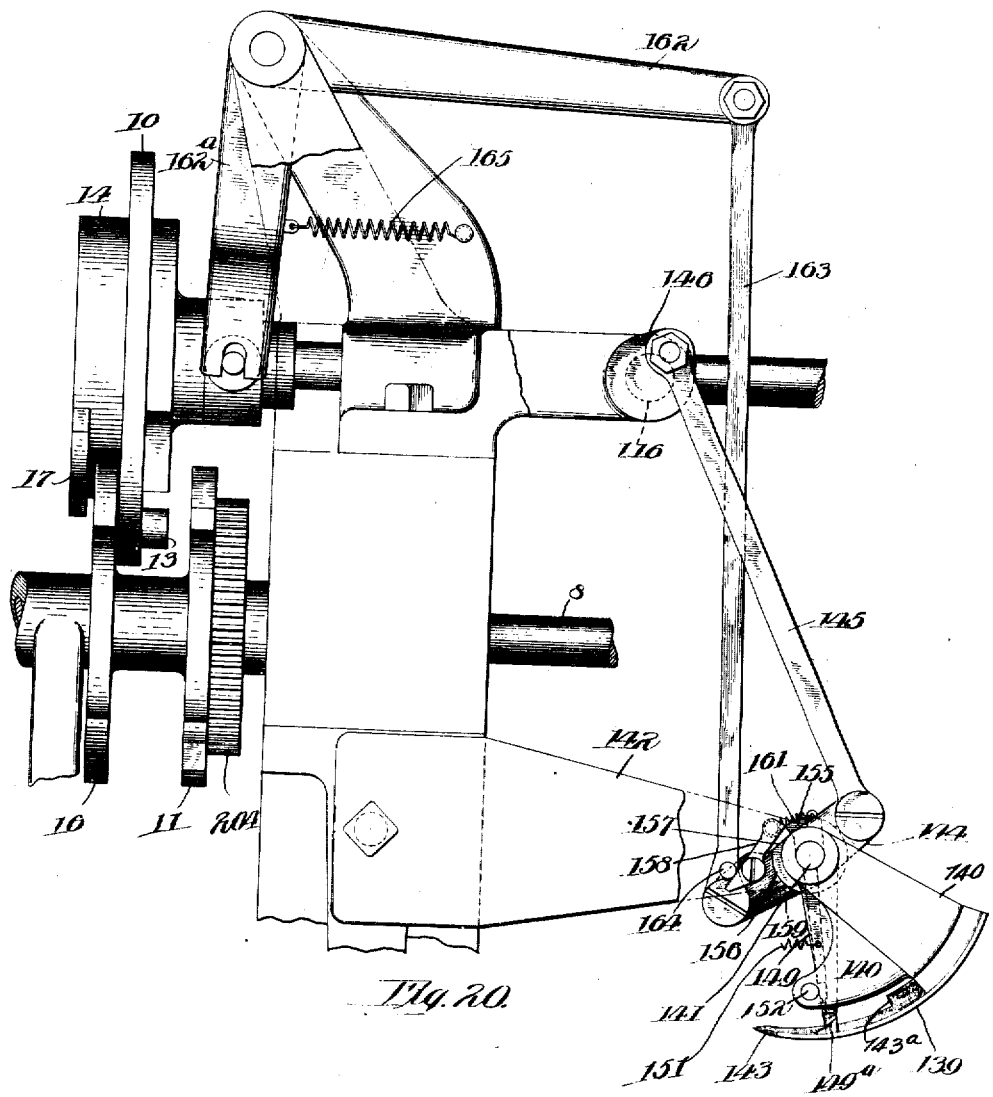

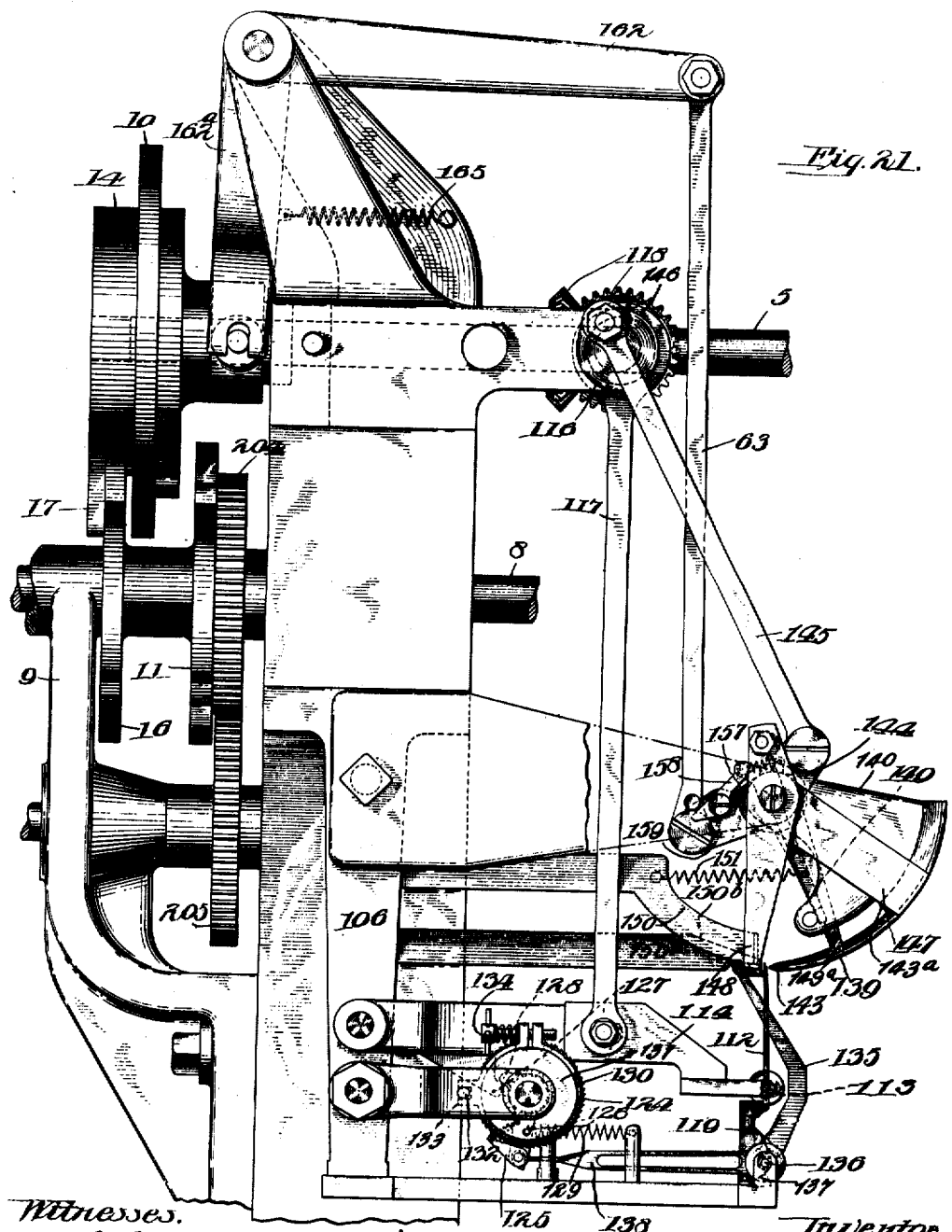

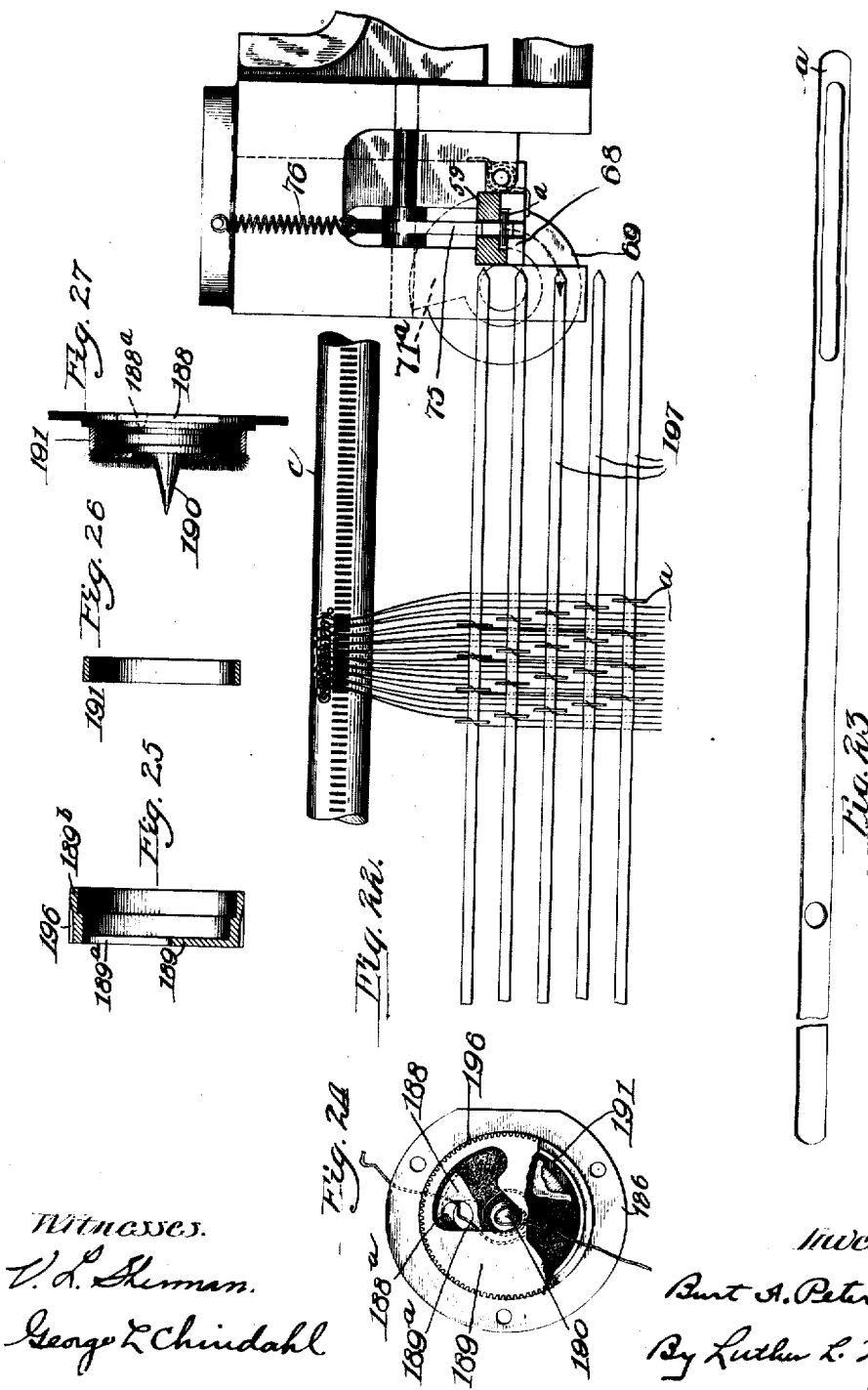

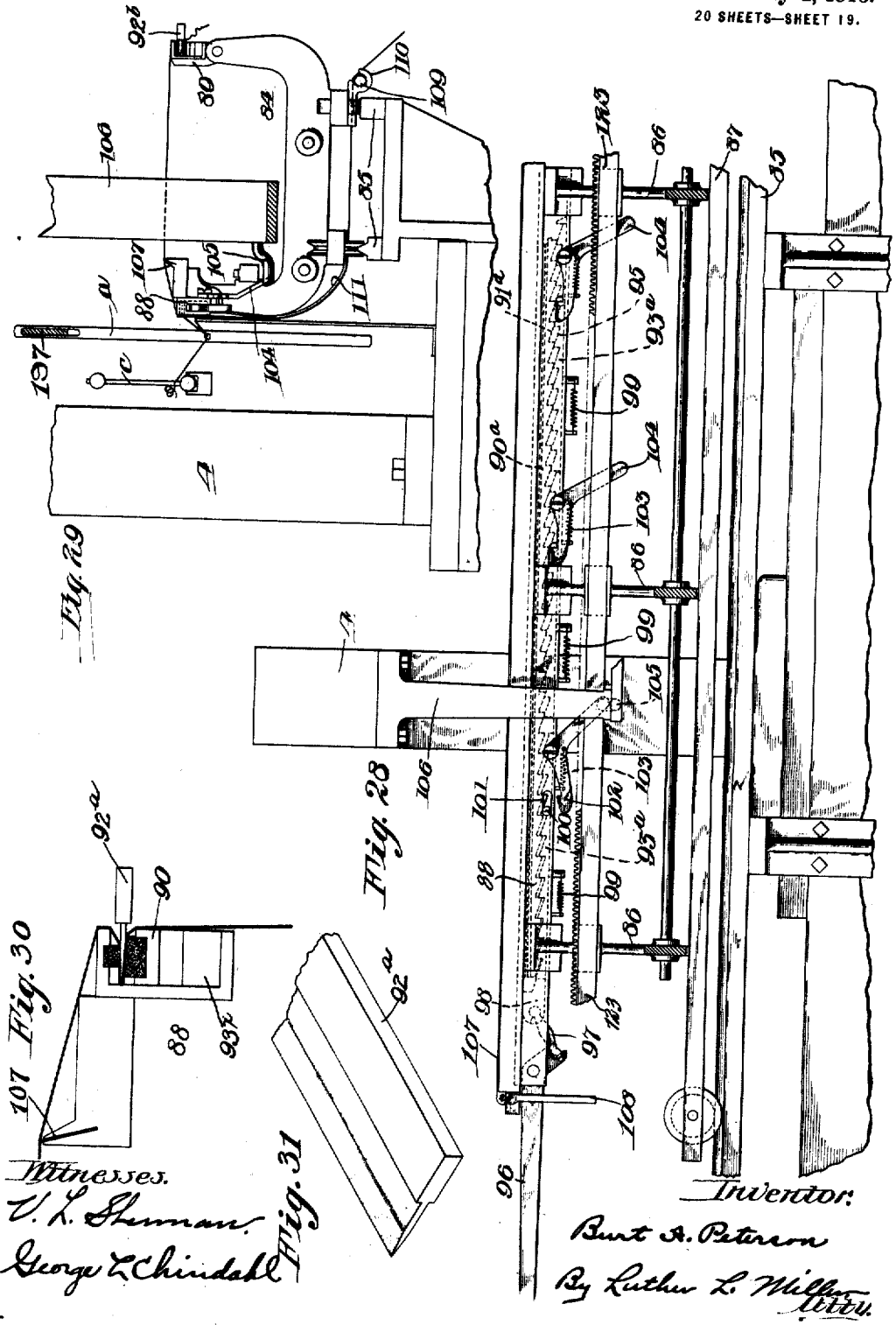

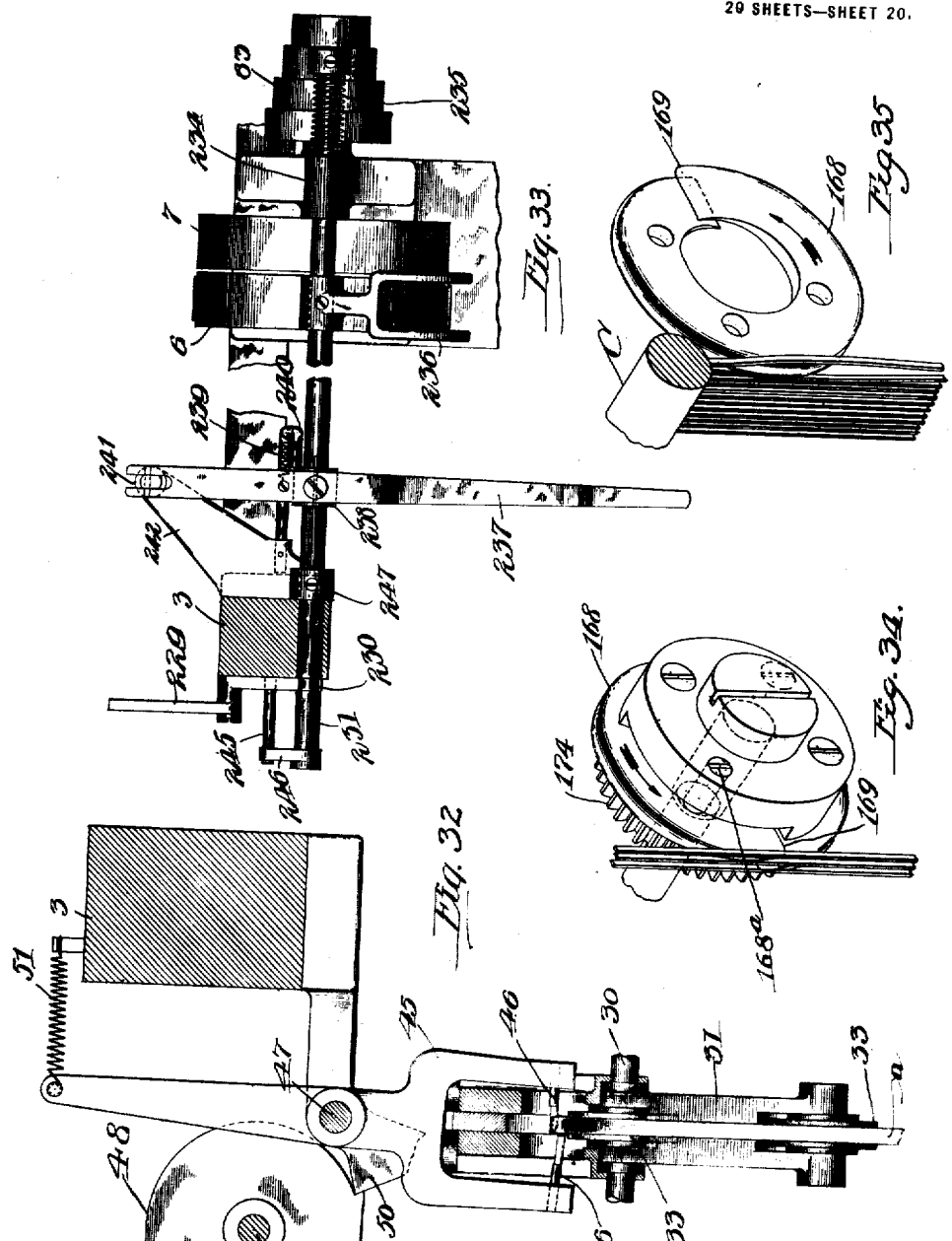

UNITED STATES PATENT OFFICE.

BURT A. PETERSON, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

WARP-DRAWING MACHINE.

1,190,245.  Specification of Letters Patent.  Patented July 4, 1916.

Application filed October 28, 1907. Serial No. 399,445.

*To all whom it may concern:*

Be it known that I, BURT A. PETERSON, a citizen of the United States, residing at Rockford, in the county of Winnebago and State of Illinois, have invented certain new and useful Improvements in Warp-Drawing Machines, of which the following is a specification.

This invention relates to a machine for engaging warp threads with a loom reed and detached warp-thread-engaging elements, such as metallic heddles, detector elements, and the like. The embodiment herein shown is adapted to operate upon the heddle known as the Northrop steel heddle. Said heddle is shown in Patent No. 536,968, issued April 2, 1895, to Charles F. Roper.

One of the objects of the invention is the production of means for selecting metallic heddles or detector elements singly and successively from a quantity of detached heddles or detectors.

Another object is the production of means for advancing the selected heddle or detector into a position where its thread-receiving eye lies in the path of a needle carrying a thread to be drawn in.

A further object is to provide means for transferring the threaded heddles or detectors to stringing bars.

The invention further refers to a means for supporting a plurality of stringing bars, and for moving said stringing bars in a predetermined cycle of movement into position to receive the heddles or detectors.

The invention further refers to means for automatically stopping the mechanism when no heddle is advanced into position to receive the drawing-in needle through its threading eye.

The invention also refers to a mechanism for separating each warp thread, when selected for drawing in, from the adjacent threads of the warp, and for severing one end of said selected and separated warp thread in order to provide a loose end to be engaged by the needle and drawn through the thread eye of the heddle.

The invention further refers to an automatic stop mechanism for suspending the heddle feed when no thread is taken by the thread-selecting means, arranged to permit said selecting mechanism to continue endeavoring to select a thread.

The invention also refers to a twisting mechanism for winding the drawn-in ends together after they have passed through the reed, in order to prevent individual threads from being accidentally withdrawn from the reed and heddle eyes.

The invention also relates to the other improvements in warp-drawing machines hereinafter set forth.

Figure 2:
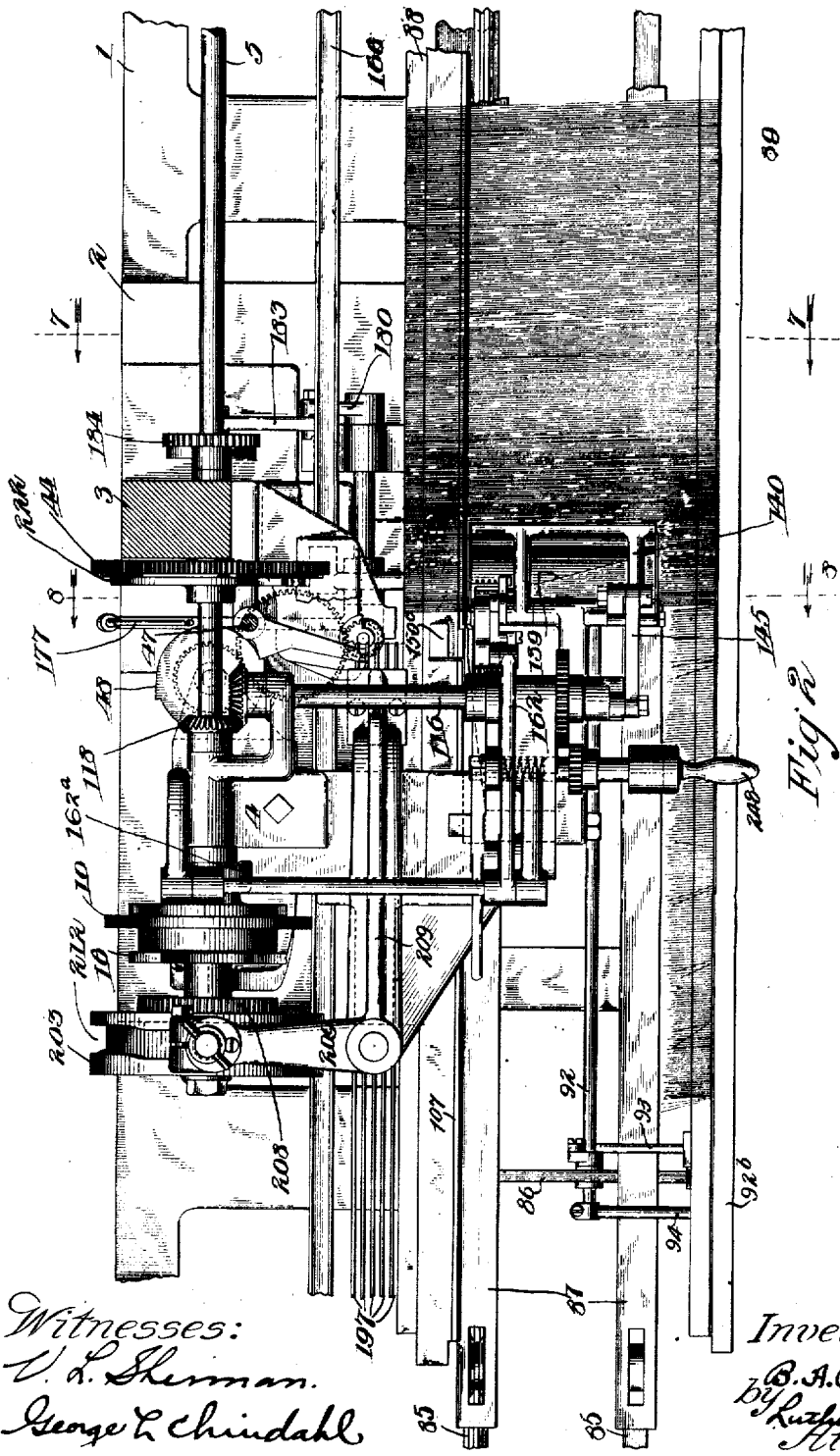
Figure 5:
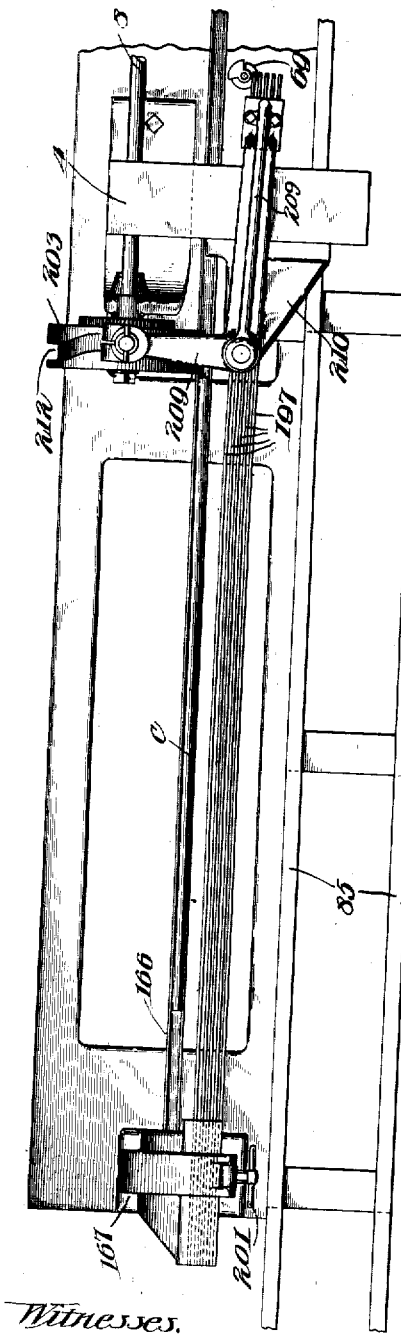
Figure 6:
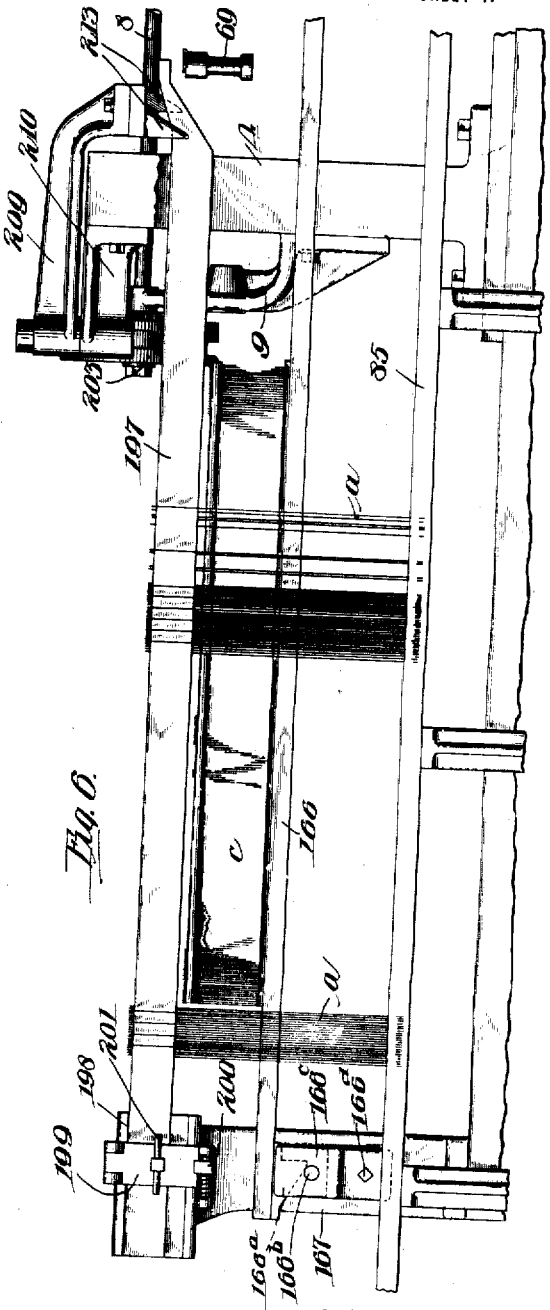

In the accompanying drawings, Figure 1 is an end elevation of the machine taken from the right-hand end thereof, the belt-shifter and one of the bearings for the drive shaft being omitted, and certain other parts being shown in section. Fig. 2 is a horizontal section on dotted line 2 2, Fig. 1, a portion of the heddle-handling devices being removed and the ends of the supporting framework being broken away. Fig. 3 is a fragmental vertical sectional view, the warp carriage and thread-separating mechanism being removed. Fig. 4 is a vertical sectional view on dotted line 4, Fig. 3. Fig. 5 is a plan view of the heddle-stringing mechanism. Fig. 6 is a side elevation of the heddle-stringing mechanism. Fig. 7 is a fragmental vertical sectional view through the mechanism, taken on dotted line 7 7, Fig. 2. Fig. 8 is a fragmental vertical sectional view taken approximately in the plane of dotted line 8 8, Fig. 2. Fig. 9 is a fragmental vertical sectional view taken approximately in the plane of dotted line 8 8, Fig. 2. In this figure the parts are shown in different positions from those they occupy in Fig. 8. Fig. 10 is a detail view of the heddle-turning and stringing devices. Fig. 11 is a fragmental front elevation showing the twister mechanism and the needle turner mechanism. Fig. 12 illustrates, in side elevation, the heddle hopper, the heddle-feeding mechanism, the turner and the automatic stop for the heddle feed. This view is taken from the left-hand end of the machine. Fig. 13 is a fragmental side elevation showing the heddle hopper and a portion of the heddle feeding mechanism, including the heddle escapement. This figure is taken from the right-hand end of the machine. Fig. 14 is a fragmental side elevation of the automatic stop for the heddle mechanism. In this figure the parts are shown in their normal positions; *i. e.*, in the positions they assume while the machine is in its normal operation. Fig. 15 is a view similar to that of the last preceding figure, the parts of the mechanism being shown in the position they occupy when the feeler finger encounters no heddle at the proper point. Fig. 16 is a view similar to the last preceding figures, but with the belt-shifting fork and hand lever added, the automatic stop mechanism being in the position it assumes when the feeler finger strikes against a heddle instead of entering the lower part of the stringing eye, as is shown in Fig. 14. Fig. 17 is a perspective view illustrating the action of the turner mechanism, and the timing of its movement with relation to the detent which permits the introduction of a new heddle into the turner mechanism. Fig. 18 is a fragmental elevation showing the stumbler mechanism which detects the absence of a warp thread at the separator mechanism. Fig. 19 is a view similar to the last preceding figure but showing the parts in the positions they assume when no thread is present at the stumbler mechanism. Figs. 20 and 21 are views similar to the last preceding figure, but showing the stumbler mechanism in different positions. Fig. 22 is in the nature of a diagram illustrating the position of the heddles upon the several stringer bars with relation to the reed, the course of the thread in passing through the heddles and reed, and the twisted ends of the threads for preventing their being accidentally withdrawn from the reed. Fig. 23 is a perspective view of a form of steel heddle upon which the mechanism hereinafter to be described is intended to operate. Figs. 24, 25, 26 and 27 are detail views of the twister. Fig. 28 is a fragmental longitudinal vertical section through the warp carriage. Fig. 29 is a left-hand end view of the warp carriage, the reed and a heddle also being represented. Fig. 30 is a view of one of the warp clamps and the deflecting ribbon on the warp carriage. Fig. 31 is a perspective view of the insertion bar for said warp clamp. Fig. 32 illustrates the heddle escapement mechanism. Fig. 33 represents the belt-shifting devices. Figs. 34 and 35 are views of the reed feeder and opener.

The embodiment herein shown of my invention comprises a supporting bed 1, upon the longitudinal middle portion of which is secured a bed plate 2. Upon said bed plate are rigidly fixed two posts 3 and 4. A main drive shaft 5, rotatably mounted in suitable bearings in said posts, carries a tight and a loose pulley 6 and 7, respectively, (Figs. 1 and 3). Directly beneath the main shaft 5 a shaft 8 (Figs. 3 and 18) is rotatably mounted in suitable bearings in the post 4 and a bracket 9 secured to the side of said post. The shaft 8 is intermittently driven from the shaft 5 by means of a pin disk 10 slidably mounted upon the shaft 5, but rotatably connected therewith by means of a feather or spline (not shown). Upon the shaft 8 is a star wheel 11 (Figs. 3 and 4) having four radial slots 12 therein, which slots are adapted to receive the pin 13 of the disk 10. Between the slots 12 the periphery of the star wheel 11 is made concave to receive the periphery of the hub 14 of the disk wheel 10, said hub having a cut-away portion 15 opposite the pin 13. Upon the shaft 8 is fixed a stop wheel 16 of the same diameter as the star wheel 11 and having its periphery concaved similarly to said star wheel to receive the periphery of the hub 14 of the disk 10 when said disk is moved longitudinally of the shaft 5, as explained hereinafter. Upon the hub 14 is a radial leaf 17 adapted to rotate in a vertical plane at the left hand side (Fig. 3) of the stop wheel 16 when the disk 10 is shifted as before mentioned.

On the upper end of the post 3 is secured a hopper 18 (Figs. 1, 12 and 13) for receiving the loose heddles, the bottom of said hopper inclining downward toward the forward end thereof. The hopper is provided with a hinged side 19 which may be swung downward by the operator for the introduction of a supply of heddles, said hinged side normally being held closed by a coiled spring 20. A supply of heddles is held in readiness to be placed by the operator in the hopper 18, upon a reel 21 rotatably mounted in a bracket 22 fixed to the post 3. Said reel comprises a hub 23 having a plurality of pairs of arms 24. A pin 25 extends through each pair of the arms 24 at a point between their ends. The heddles a are strung upon bars 26 adapted to be inserted between two arms 24, and each having a notch 27 in its inner end adapted to receive a pin 25. The bars 26 are supported at a point between their ends upon a ring 28 fixed to the bracket 22. A pin 29 extending through each of the bars 26 prevents the heddles a from sliding too far inward upon said bar. At a point directly above the hopper 18 the ring 28 is notched so that as the operator rotates the reel to bring an armful of heddles into the hopper, the arm is permitted to swing downward to allow the heddles to slip off from the arm, the heddles standing upon the inclined bottom of the hopper. (See Fig. 13.) In the lower end of the hopper 18 is rotatably mounted a shaft 30 upon which is loosely mounted an arm 31 carrying at its upper end a shaft 32. A feed roll 33, faced with leather, cork, rubber or other suitable material, is mounted upon each of the shafts 30 and 32. The arm 31 carries near its middle portion an idler roll 34. Said arm is arranged to be fixed in adjusted position by means of a clamp nut 35. The feed rolls 33 are connected to rotate together by means of sprocket wheels 36 and 37 (Fig. 12) mounted on the shafts 30 and 32, respectively, and a sprocket chain 38 running over said wheels. A shaft 39 is rotatably mounted upon the post 3 and carries a sprocket wheel 40 over which and a sprocket wheel 41 (Fig. 1) fixed on one end of the shaft 30 runs a sprocket chain 42. The shaft 39 is driven from the main drive shaft 5 through intermeshing gears 43 and 44 (Fig. 14).

As shown in Fig. 13, the feed rolls 33 rotate in contact with the foremost heddle in the hopper 18 and by their rotation tend to move said heddle downward out of the hopper. At the lower end of the hopper I provide an escapement comprising a yoke 45 (Figs. 13 and 32) in each arm of which is fixed a pin 46, one slightly above and rearward of the other. The pins 46 are arranged to be brought alternately close to the bottom of the hopper 18 to form a stop for the foremost heddle. The yoke 45 is fixed to the uper end of a vertical shaft 47 and is oscillated to time or regulate the escape of the heddles from the magazine 18 by means of a cam disk 48 (Figs. 2, 3, 17 and 32) fixed upon a shaft 49, a finger 50 adapted to lie in contact with the periphery of said cam disk being fixed to the lower end of the vertical shaft 47. A spring 51 holds the finger 50 in contact with said cam disk. The shaft 49 is driven from the shaft 8 through the intermeshing gears 52 (Fig. 3).

The extreme lower end of the hopper 18 is formed into a delivery chute 53 (Fig. 13) and is provided with two pairs of idle feed rolls, each pair comprising the non-adjustable roll 54 and the adjustable roll 55. The roll 55 is mounted in the forward end of a support 56, a spring 57 rearward of said support forcing said roll toward the roll 54. A screw 58 permits of adjusting the tension of said spring. A chute 59 at the lower end of the hopper 18 provides a passage for the downwardly moving heddles. The forward wall 60 of said chute is removably held in place by a clamp 61. Just before reaching the heddle-turning mechanism the descending heddle is stopped by a gate 62 (Fig. 17) which is adapted to be projected into the chute 59, said gate having an arm 63 which is arranged to be engaged by an arm 50ᵃ projecting from the vertical shaft 47. It will be seen that an oscillatory movement of said shaft not only operates the escapement mechanism to permit the heddle to pass into the chute 59, but also operates the gate 62 to allow the heddle already in the chute to escape therefrom. Just below the gate 62 is a pair of feed rolls 64 (Figs. 9, 15 and 17) similar to the feed rolls 54, 55, but connected to rotate together by means of the intermeshing gears 65 and driven from the shaft 39 through the medium of sprocket wheels 66 and a sprocket chain 67 (Fig. 12).

The forward side of the chute 59 below the feed rolls 64 is closed by a spring-closed door 68 (Fig. 17).

The heddle-turning mechanism comprises a mandrel 69 (Fig. 8) rotatably mounted in a bracket 70 (Fig. 3), said bracket being adjustable vertically upon the post 3. The mandrel 69 has a longitudinal radial groove 71 into which the heddle is longitudinally inserted in its downward movement. The bracket 70 is open at one side, as at 70ᵃ (Figs. 10 and 14) to permit the heddle to leave the turner mandrel after said mandrel has placed the heddle on the stringer bar, as will appear more fully hereinafter. On the upper end of the turner mandrel is a cam flange 71ᵃ (Fig. 17) for opening the door 68. Said mandrel is driven from the intermittently rotated shaft 49 (Fig. 8) through the gear 72 on said shaft, an intermediate gear 73 carried in the bracket 70, and gear teeth 74 formed upon said mandrel. The mandrel is rotated through one revolution for the passage of each heddle, thus at each rotation bringing the groove 71 into alinement with the chute 59. A bell-crank lever 75 (Figs. 9 and 15) is pivotally mounted so that one of its arms extends into the path of the downwardly-moving heddles at a point directly beneath the driven feed rolls 64. A spring 76 throws said arm into the stringing eye of the heddle as soon as the latter has passed said feed rolls, said heddle then hanging upon said lever and extending through the groove 71 in the turner mandrel, with its thread eye in the path of the drawing needle.

The beam b (Fig. 1) containing the warp to be drawn in is mounted upon a suitable truck (not shown) arranged to move longitudinally of the bed 1, at the forward side thereof, upon the floor or upon rails laid on the floor. Any suitable means may be provided for thus moving the beam truck. That herein shown comprises a half-nut 77 (Fig. 1) carried by an arm 78 attached to the truck, said half-nut engaging a screw-threaded feed shaft 79 mounted in the supporting frame of the machine. The feed shaft 79 is geared to a stub shaft 80 carrying a cone pulley 81, said cone pulley receiving a belt 82 extending over a similar pulley 83 upon the drive shaft 5.

The end of the warp is secured in a warp carriage 84 movably mounted upon rails 85 in the machine. The carriage 84 comprises a plurality of yokes 86 (Figs. 8 and 28) rigidly secured together by means of longitudinal bars 87. At the upper end of the arms of the yokes are two longitudinally extending thread clamps, the clamp 88 at the rear side of the carriage being fixed with relation to said carriage, while the clamp 89 at the forward side of the carriage is pivotally connected with the yoke arms in order that said last mentioned clamp may have a movement toward or away from the fixed clamp. Arms 90 fixed to the clamp 89 are connected with the arms 91 upon a rock shaft 92 in the warp carriage by means of links 93. Said shaft is arranged to be rocked to stretch the warp threads by means of the hand lever 94, the clamp 89 being locked in position by throwing the arms 91 slightly over center.

The clamps 88 and 89 may be of any desired construction. In the present instance, each is in the form of a channel bar (Figs. 8 and 30), one flange of which has a lining of yielding material, said channel bar containing a similarly-faced clamp bar 90ª having wedging teeth 91ª (Fig. 28) upon its lower side. The threads are inserted between the clamp bar 90ª and the opposite wall of the channel bar by means of an insertion bar (Figs. 30 and 31), and said clamp bar moved to clamp the threads by means of a locking bar having wedging teeth adapted to ride upon the teeth 91ª. The insertion bar 92ᵇ for the clamp 89 is left in the clamp, but the insertion bar 92ª for the clamp 88 is withdrawn when said clamp 88 is partly closed. The locking bar for the clamp 88 is numbered 93ˣ in the drawings, and the locking bar for the clamp 89 is numbered 94ª.

The lengths of the reed and the harnesses and the width of the warp being different, the movement of the reed and the warp tends to cause the drawn-in thread-ends to be withdrawn from the reed. I therefore provide means for opening the clamp 88 in sections so as to permit the drawn-in threads to be released from the clamp as the reed, harnesses and warp are fed along. The locking bar 93ˣ for the clamp 88 comprises the sections 93ª (Fig. 28). Each section has locking teeth inclined oppositely to the locking teeth 91ª. The locking bar sections are longitudinally moved into the clamping position by means of a hand lever 96 having a toggle link 97 connection with a block 98. When the hand lever 96 is swung downward the thread clamp 88 is closed, the block 98 forcing the locking-bar sections 93ª longitudinally in the channel bar, each section moving the one ahead of it. A spring 99 tends to move each locking-bar section into the unlocking position. A stud 100 fixed to each locking-bar section projects through an elongated opening 101 in the vertical wall of the channel bar, into position to be engaged by a hook 102 pivoted upon said channel bar. A spring 103 tends to hold the hook in engagement with said stud. An arm 104 fixed to the hook 102 is arranged to strike a pin 105 fixed in a bracket 106 extending from the post 4. After the operator has placed the threads in the clamp, he operates the hand lever 96 to clamp the threads therein, the hooks 102 automatically engaging the studs 100 to hold the clamp in the locked position. The operator then releases the hand lever 96, leaving the thread clamp in condition to be opened section by section as the arms 104 of the hooks 102 successively engage the pin 105 during the travel of the warp carriage.

The locking bar 94ª for the clamp 89 is not sectional, and is operated by a hand lever (not shown) similar to the hand lever 96.

Near the fixed clamp 88 is a longitudinally-extending metallic ribbon 107 (Fig. 30) having a serrated upper edge. Said ribbon is susceptible of being moved longitudinally for a slight distance by means of a lever 108 (Fig. 28). When the threads have been secured in the clamps 88 and 89 and tension placed upon the threads by moving the clamp 89 bodily away from the clamp 88, said threads are slightly deflected sidewise by a longitudinal movement of the ribbon 107. In passing from the warp beam to the clamps upon the warp carriage the threads extend over a roll 109 (Fig. 8) loosely mounted in pockets 110 upon the warp carriage, and behind a shield 111 secured to said carriage.

The thread-selecting mechanism will next be described. The selector proper consists of a tapered pin 112 (Fig. 19) provided with a minute hook or barb near its forward end of a size suitable to hook or spear one of the warp threads of the size upon which the machine is being operated. Said selector is arranged to be reciprocated across the plane of the warp at a point close to the deflecting ribbon 107, a spring 113 (Fig. 7) yieldingly moving said selector toward the foremost thread of the warp. When the selector lifts the thread from the ribbon 107, said thread springs into a straight line between the clamps 88 and 89, thus moving away from the body of the warp. The selector is mounted in the forward end of an arm 114 pivotally mounted in the bracket 106. The arm 114 is rocked by means of an eccentric 115 upon a shelf 116, and an eccentric rod 117. The shaft 116 is driven from the drive shaft 5 through the intermeshing bevel gears 118. A cam finger 119 fixed to the bracket 106 engages the curved rear end of the member 120 (Figs. 7 and 19) in which the selector 112 is mounted, and moves the upper end of the selector away from the warp after said selector has engaged a thread. The warp carriage 84 is moved upon the rails 85 by means of a pinion 121 (Fig. 8) fixed upon a shaft 122 (Fig. 19), said shaft being mounted in the bracket 106, and said pinion engaging a rack bar 123 (Figs. 8 and 28) fixed to the carriage. Upon the shaft 122 is fixed a ratchet wheel 124 (Figs. 8 and 21) the teeth of which are adapted to be engaged by a pawl 125 carried by an arm 126 pivotally mounted upon said shaft. Upon the upward movement of the arm 114 a finger 127 rigidly attached thereto engages a lug 128 on the hub of the arm 126 and moves said arm to give the pawl 125 a feed movement. A spring 129 restores said arm and said pawl upon the downward movement of the arm 114. In order that the warp carriage may not move through momentum, I provide a brake for the shaft 122 comprising a band 130 encircling a brake disk 131 fixed on said shaft. The band 130 is held from rotation by means of a pin 132 engaging lugs 133 on said band. A screw 134 provides means for regulating the pressure of the band 130 upon the brake disk 131.

The warp carriage 84 is sensitively fed, being moved only as fast as the necessities of the work require. When warp threads are in position to be engaged by the selector 112 the feed of the warp carriage is suspended by means of a bell-crank lever 135 pivotally mounted at 136, one end of the upwardly-extending arm of said lever lying in the plane of the warp threads. A spring 137 normally holds said lever arm in contact with the warp threads. When warp threads are present at the selector mechanism the end of the horizontal arm 138 of said bell-crank lever lies in position to prevent a restoring movement of the pawl 125. When threads are absent from the selecting point, the spring 137 rocks the bell-crank lever to withdraw said horizontal arm from engagement with said pawl, and the carriage is fed along until a thread is in position to be taken by the selector 112.

The selector thread is separated from the body of the warp by means comprising a curved plate 139 fixed to arms 140, (Fig. 8), said arms being secured to a shaft 141 (Fig. 20) pivotally mounted in an arm 142. The operating edge of the plate 139 is beveled or inclined at an angle of about 30° with said shaft as shown most clearly in Fig. 2. At its rear end it is provided with a separator finger 143. The plate 139 is oscillated by means of a crank 144 fixed at the forward end of the shaft 141, which crank is connected by a connecting rod 145 with a crank arm 146 fixed upon the shaft 116. To the forward end of the separator plate 139 and at one end of its beveled separating edge is fixed a shear blade 147 (Figs. 8 and 19) adapted to coact with a stationary shear blade 148 fixed to the arm 142. As the separator plate 139 is oscillated the finger 143 enters between the selected thread and the body of warp threads, and the plate, following said finger, separates the selected thread from the adjacent threads substantially throughout its length between the clamps 88 and 89. When the operating edge of the plate 139 has passed the selected thread the latter has been raised from the body of warp threads so that it is cut between the two shear blades 147 and 148 as they come together. To clamp the thread before it is severed, in order that it shall not jump or become slack at the rear end of the separator plate, I provide an arm 149 (Fig. 8) pivotally mounted upon the shaft 141 and arranged to clamp the thread between itself and the outer end of the forward one of a number of stationary fingers 150 (Figs. 8 and 21). A block 149$^a$ (Fig. 20) fixed to the arm 149 and having an inclined face raises the selected thread into proper position for clamping, if it has not already been so raised by the separator plate. A spring 151 tends to move the arm 149 into clamping contact with said finger, and a pin 152 fixed in one of the arms 140 withdraws the arm 149 upon the return movement of the separator plate.

Directly behind the fingers 150 (Fig. 21) is a stationary plate 150$^a$ having at its free end an upwardly inclined surface 150$^b$ upon which the separated thread is pushed by a shoulder 143$^a$ on the separating finger 143 (Fig. 18). The incline 150$^b$ assists to raise the separated thread to the proper height to be taken by the drawing needle hereinafter described. The separated thread then lies against the free end of a stationary plate 150$^c$ (Figs. 2 and 7) which serves to hold the thread in the proper vertical plane with respect to the needle.

Should the selector fail to take a thread, it is desirable to stop the heddle-handling mechanism while the selector mechanism continues to endeavor to take a thread. It will be seen that the heddle-handling mechanism is driven from the shaft 8, while the warp carriage and the warp-thread selecting and separating mechanism are driven from the drive shaft 5. In order, therefore, to suspend the action of the heddle-handling mechanism I provide means for breaking the operative connection between the shafts 5 and 8, said means being automatically operated upon the failure of the selector to take a thread. This mechanism will now be described.

The stationary fingers 150 (Figs. 8 and 21) are located near the rear end of the separate or plate 139 and are formed on the arc of a circle to permit said plate to be oscillated beneath them. A fork 153 (Fig. 18) is pivotally mounted upon the shaft 141, the tines of said fork being adapted to enter between the fingers 150, which a spring 154 causes them to do when no thread extends across the ends of said fingers. The pin 152 swings the fork 153 rearwardly at each return movement of the plate 139. The upper end of the fork 153 is in the form of a rest 155 (Fig. 8), the upper end of said rest being curved on the arc of a circle concentric with the center of the shaft 141. A disk 156 is fixed upon said shaft, and has a notch 157 (Fig. 18) therein adapted to be engaged by a pawl 158 pivotally mounted on an arm 159, the latter being loosely mounted on the shaft 141. A pin 160 (Fig. 8) projects rearwardly from said pawl and normally lies upon the rest 155, by which means the pawl is held out of the notch 157. A spring 161 tends to move the pawl in one direction. When a thread has been selected, said thread lies in front of the fingers 150 and prevents the fork 153 from entering between said fingers. When the selector fails to take a thread the tines of the fork 153 are drawn by the spring 154 between the fingers 150, as shown in Fig. 19, withdrawing the rest 155 from beneath the pin 160 and permitting the pawl 158 to enter the notch 157. When the return movement of the separator plate 139 begins the arm 159 is rocked downwardly, said arm being connected with a crank arm 162 by means of the connecting rod 163. The crank arm 162 is fixed to a shaft carrying a fork 162ª connected with the hub of the pin disk 10. The downward movement just described of the arm 159 therefore shifts the pin disk 10 longitudinally of the drive shaft 5 to withdraw the pin 13 out of the vertical plane of the star wheel 11, and to engage the hub 14 of said pin disk with the stop wheel 16. When the separator plate 139 has nearly completed its return movement, a pin 164 on the connecting rod 163 engages the rear end of the pawl 158 and lifts the forward end thereof out of the notch 157 in order that the rest 155 may be placed beneath the pin 160 during the remainder of the return movement of the separator plate 139 (Fig. 20). As soon as the pawl 158 is disengaged from the notch 157, a spring 165 raises the arm 159 and the pawl 158 slightly (Fig. 21), the leaf 17 on the hub of the pin disk 10 preventing disengagement of said hub and the stop wheel 16 until the pin 13 has passed the slots 12 in the star wheel 11, when the rotation of the leaf 17 out of contact with the stop wheel 16 permits the spring 165 to return the pin disk 10 into operative relation with the star wheel 11. If upon the next forward movement of the separator 139 and the fork 153 the latter is stopped by a selected thread (Fig. 18), the rest 155 remains under the pin 160 and the heddle-handling mechanism will be actuated when the pin 13 engages the star wheel 11. If the fork 153 is not so stopped, the pin disk 10 is shifted away from the star wheel 11 upon the next return movement of the separator and before the pin 13 engages in a slot 12.

The reed c is arranged to travel longitudinally of the bed 1 upon a channel track 166 (Figs. 5 and 6) vertically-adjustably mounted upon the post 3 and the posts 167 at opposite ends of the bed 1. Any suitable means may be employed for adjustably mounting the channel track 166. That herein shown consists of wedging blocks 166ª (Figs. 6 and 11) fixed to the track and resting upon pins 166ᵇ fixed in brackets 166ᶜ clamped to the posts 3 and 167 by means of the bolts 166ᵈ. When the bolts 166ᵈ are slackened the track 166 may be moved longitudinally to adjust its height above the bed. The reed is fed through the machine and its splits spread for the passage of the drawing-in needle by a reed opener and feeder 168 (Figs. 34 and 35) having a portion of a screw-thread 169 upon its periphery. The ends of the thread are made thin so as to enter and leave the reed easily. The reed opener and feeder is made adjustable to reeds of different gages by springing one end of the screw-thread 169 away from the body of the device to the required distance by means of the set screw 168ª. The reed feeder and opener is supported in the machine frame with its screw-thread in position to engage the splits of the reed, and is rotated by the shaft 49 (Figs. 7 and 11) through the intermeshing bevel gears 170 and 171, a spur gear 172 secured to the bevel gear 171, an intermediate gear 173 and a pinion 174 fixed to the reed feeder and opener. The gear train described gives the reed feeder and opener a succession of half-revolutions. In the present embodiment two threads are to be drawn between every two adjacent splits in the reed. Referring to Fig. 8, the reed opener and spreader is there shown stationary. The next half revolution of said device feeds the reed the distance of one split and spreads the splits for the next forward movement of the needle. The next half revolution does not feed the reed but merely holds the same splits spread for the second forward movement of the needle. The succeeding half revolution feeds and spreads the reed as before described. The reed is held in an upright position by means of stationary members 175 and 176 (Fig. 7) lying at opposite sides thereof at the drawing-in point.

The needle 177 is secured in an arm 178 fixed to a shaft 179 supported in bearings upon the bed plate 2. At the opposite end of said shaft is a crank arm 180 which is connected with a wrist pin 181 upon a gear 182 by means of a connecting rod 183. The gear 182 meshes with a similar gear 184 fixed upon the main drive shaft 5. The needle 177, which is formed on the arc of a circle generated from the center of the shaft 179, has a notch 185 formed in its side near its forward end, which notch is in such a position and of such form that on the backward stroke of the needle the separated thread is received in said notch. When the reed feeder and opener 168 has spread apart two splits of the reed, the needle 177 is projected through the reed and through the thread eye of the heddle lying in the turner mandrel 69 and hanging upon the bell-crank 75, into position to receive the selected, separated and severed warp thread. (See Fig. 7). Upon its return movement, the needle 177 draws said thread through the heddle and the reed and through a twisting device to be next described.

The twister 186 comprises a housing 187 which is closed at its rear end by the member 188 (Fig. 27), said member having an opening 188ª (Fig. 24), therethrough for the passage of the needle 177. Within the housing 187 is rotatably mounted a disk 189 having an opening 189ª therein through which the needle passes. Fixed to the center of the rear wall of the housing is a conical stud 190. The inner face of the member 188 is covered with plush which is held in place by the ring 191 (Figs. 26 and 27). The disk 189 is rotated by means of a bevel gear 192 (Figs. 7 and 8) fixed to the bevel gear 171 and meshing with a bevel pinion 193 fixed to a short shaft 194 (Fig. 11). Upon the forward end of the shaft 194 is a gear 195 meshing with an annular series of gear teeth 196 formed in the flange 189ᵇ of disk 189. In its rotation the twister disk 189 winds the end of the drawn-in thread about the projection 190, thus forming a coil (Figs. 22 and 24) which prevents the thread from being accidentally withdrawn from the reed.

The threaded heddles are grouped as required by the pattern of the goods to be woven, by means illustrated in Figs. 2, 5, 6 and 10. A plurality of stringer bars 197 (in the present instance five) is releasably clamped to one of the posts 167 by means of a clamp consisting of a holder 198 having a hinged forward side 199. A spring latch 200 is provided for holding said forward side closed, and a screw 201 affords means for clamping the rear ends of the stringer bars within the holder. The stringer bars 197 extend longitudinally of the bed 1 and have slender upwardly bent forward ends extending to a point above the turner mandrel 69.

The stringer bars 197 are moved into position in proper order to receive the heddles from the turner mandrel by means of a pattern cam disk 203. Said cam is loosely mounted upon the shaft 8, and is driven from said shaft through back gearing (Fig. 3) comprising a spur gear 204 fixed on the shaft 8 and meshing with a gear 205 fixed upon the back gear shaft 206, and a gear 207 fixed on said back gear shaft and meshing with a spur gear 208 fixed to said cam disk. A bell-crank lever 209 (Figs. 5 and 6) is pivotally mounted upon a bracket 210 secured to the post 4, one arm of said bell-crank lever being provided with a roller stud 211 lying in the cam groove 212 of the cam disk 203. The other arm of said bell-crank lever is provided with six fingers 213 lying upon opposite sides of the forward ends of the stringer bars 197. The cam groove 212 is of such form as to cause the stringer bars 197 to be presented in position to receive the heddles discharged from the heddle-turner mechanism, in the desired order. When a different arrangement of the heddles is desired, another cam disk having a different form of cam groove is substituted for the disk 203.

Should the heddle-feeding mechanism fail to present a heddle at a point for the passage of the needle 177, a stop mechanism operates automatically to stop the machine. This stop mechanism comprises a feeler finger 214 (Fig. 15) the forward end of which finger is thrust forward at each heddle-delivery movement into the path of the heddle at a point where, if a heddle is present, the point 215 of the finger will enter the lower portion of the stringing eye of the heddle, a shoulder 216 beneath the point of said finger striking against the lower margin of said stringing eye. (See Fig. 14.) Said feeler finger at its rear end is pivotally connected with the arm 217 of a bell-crank lever 218 pivotally attached to one arm of a bell-crank lever 219 loosely mounted on the drive shaft 5. The arm 220 of the bell-crank 218 has a lug 221 thereon adapted to be acted upon by a cam disk 222 fixed on the drive shaft 5. A spring 223 attached to the arm 220 tends to move the feeler finger 214 into the path of the heddles. A coiled spring 224 attached at one end to a lug 225 projecting from the post 3 and at its other end to the bell-crank lever 219 tends to hold said bell-crank lever in the normal position, to wit, against the fixed stop arm 226. The cam disk 222 carries a stud 227 adapted to engage the lug 221 when the point 215 of the feeler finger 214 strikes against a heddle as in Fig. 16. Said cam disk also has a stop shoulder 228 thereon adapted to engage the lug 221 when no heddle lies in the path of the feeler finger 214. When a heddle is in its proper position as shown in Fig. 14, the lug 221 lies in position to pass between the stud 227 and the shoulder 228.

A latch lever 229 is pivotally mounted upon the post 3, one end of said lever being adapted to enter an annular groove 230 in the belt-shifter rod 231 under the influence of a spring 232. The other end of said lever overlies a pin 233 in the bell-crank lever 219. The shifter rod 231 is slidably mounted in the post 3 and a bearing 234 (Fig. 33). A coiled spring 235 compressed between the bearing 234 and a collar on the end of the shifter rod tends to move said shifter rod longitudinally to shift the belt from the tight pulley 6 to the loose pulley 7, a fork 236 fixed to said rod engaging the belt. A hand lever 237 is mounted to have a horizontal pivotal movement upon a collar 238 on the shifter rod 231. Said collar is non-rotatably mounted upon, but longitudinally slidable on the belt-shifter rod. A spring 239 normally holds said collar against a stop bracket 240. The rear end of the hand lever 237 is bifurcated to lie at opposite sides of a pin 241 (Fig. 16) slidably mounted in a bracket 242, a coiled spring 243 holding said pin in normal position. Studs 244 in the head of the pin 241 lie at opposite sides of the forked end of the hand lever 237. 245 is a pin fixed in the latch lever 229 and adapted to be engaged by a crank arm 246 fixed to the end of the shifter rod 231.

When a heddle is not in proper position as determined by the feeler finger 214, the lug 221 is engaged either by the stud 227 or the shoulder 228, and the movement of the cam disk 222 rocks the bell-crank lever 219 and withdraws the upper end of the latch lever 229 from the annular groove in the belt shifter rod 231. The latter under the influence of its spring 235 (Fig. 33) immediately shifts the belt onto the loose pulley, thus stopping the entire machine. The spring 224 takes up the shock of the engagement of the lug 221 and the cam disk 222. When the trouble in the heddle chute has been remedied by the operator he swings the hand lever 237 to the left (Fig. 33), the collar 238 bearing against a collar 247 fixed on the shifter rod. The latter is thus moved longitudinally to place the belt upon the tight pulley 6, and the latch lever 229 is engaged with the grooved portion of said rod by the spring 232. When the operator desires to stop the machine he rocks the shifter rod 231 by raising the forward end of the hand lever 237, the crank arm 246 fixed on said shifter rod engaging the pin 245 and withdrawing the latch lever 229 from engagement with the shifter rod, which rod is then moved by the spring 235 to throw the belt onto the loose pulley.

Fig. 2 shows a hand driving crank 248 which is arranged to be placed in and out of gear with the shaft 116. This crank is omitted from the other views.

In operation, the warp carriage and the reed are fed past the operating mechanism, heddles are singly and successively fed to the threading position, and warp threads are selected, severed and drawn through the heddles and the reed, the ends of the drawn in threads being coiled by the twister. The threaded heddles are removed from the chute 59 by the turner 69, the cam 71ª (Fig. 17) causing the door 68 to open to permit the escape of the heddle from the chute. The turner 69 carries the heddle into register with the stringer bar 197 which has been positioned by the cam 203, the end of said bar being received in the stringing eye of the heddle. As the turner continues to revolve, the heddle slips out of the radial slot 71 of the turner. In moving from the heddle chute to the stringing bar, the heddle also descends some little distance, as the result of which movements the coil of thread formed by the twister is withdrawn from the latter. As indicated in Fig. 6, the fingers 213 are staggered to enable the heddle to pass the fingers and move onto the body of the stringing bar 197. In the onward movement of the warp carriage and the reed, the heddle is pulled along the stringing bar.

After the warp has been drawn through the heddles and the reed, the rod 109 is removed from the pockets 110, the warp carriage 84 is lifted from the machine, the heddles are removed from the stringing bars 197 and suitably maintained in series, and the reed, heddles and beam $b$ sent to the weave room.

The drawings comprised in this specification illustrate merely one form of apparatus for carrying out my invention.

I claim as my invention:

1. A warp-drawing machine having, in combination, mechanism for handling thread-engaging elements, a thread selector, and means controlled by selected threads for intermitting the operation of the first mentioned mechanism during the continued operation of the thread selector.

2. In a warp-drawing machine, in combition; a heddle magazine; a chute; an escapement between said magazine and said chute; means for moving the heddles through said chute; a drawing mechanism; a gate at the outlet end of said chute; and a positioning means between said chute and said drawing mechanism.

3. In a warp-drawing machine, in combination, a drawing mechanism; a stringer bar; means structurally independent of said stringer bar for holding heddles; a member arranged to engage a heddle; and means for turning said member to transfer the heddle from operative relation to the drawing mechanism to said stringer bar.

4. In a twister, the combination, with a frame, of a stationary member having an opening therein; a member rotatably mounted in said frame and having an opening therein arranged to register with the stationary opening; a conical projection on the stationary member and extending centrally of the rotatable member and through the opening therein; a plush lining on the stationary member; and means for rotating said rotatable member.

5. In a warp-drawing machine, in combination, two shafts; heddle-handling mechanisms driven from one of said shafts; warp-thread-handling mechanisms driven from the other shaft; and means controlled by the warp threads for disconnecting the heddle-handling-mechanism shaft from its source of power.

6. In a warp-drawing machine, in combination, a shaft carrying a pin disk; a shaft carrying a star wheel arranged to be rotated by said pin disk; a hub on said pin disk; a leaf on said pin disk; a stop wheel on the second mentioned shaft, having its periphery concaved to receive said hub; warp-thread-handling mechanisms driven by the first mentioned shaft; heddle-handling mechanisms driven by the second mentioned shaft; and means controlled by the warp threads for disengaging said pin disk from said star wheel, said leaf being adapted to engage said stop wheel, for holding said pin disk out of operative relation to said star wheel.

7. In a machine for operating upon detached warp-thread-engaging elements, each having an opening therein, in combination, a positioning device for the elements, adapted to engage in said opening; a stop mechanism for the machine; and a member controlling said stop mechanism, adapted to enter the opening in the element and having a shoulder adapted to stop against said element.

8. In a textile machine, a stop mechanism comprising a cam carrying two stops; a bell crank lever arranged to be moved by said cam, one arm of said bell crank lever being adapted to engage either of said stops and to pass between them; a spring tending to move said arm into engagement with one of said stops; a feeler finger connected to the other arm of said bell crank lever; and a stop means operated by the bodily movement of said bell crank lever.

9. The combination, with a thread-selecting mechanism, of a stationary fork; a curved oscillating separator plate; a pivoted fork; a spring tending to move said fork in one direction; means attached to said separator plate for moving said fork in the other direction; and a stop means operated by said movable fork.

10. In a machine for operating upon warp threads, a warp carriage comprising two warp clamps, and means for releasing a part only of the threads in one of said clamps.

11. A machine for operating upon warp threads having, in combination, a warp carriage having two clamps, one of said clamps being formed in sections, and means for successively releasing the clamp sections.

12. A machine for operating upon warp threads having, in combination, a warp carriage having a clamp, a series of devices for holding the clamp closed, and means to successively operate said devices.

13. In a warp-drawing machine, in combination, a bed; a drawing mechanism located centrally of the bed; a warp carriage supported on said bed for movement to and past the drawing mechanism; and a heddle hopper located above the drawing mechanism and operatively connected to said mechanism.

14. In a machine for operating upon detached warp-thread-engaging elements, each having a stringing eye, in combination, a magazine; a chute; an escapement between said magazine and the upper end of said chute; an operating mechanism at the lower end of said chute; and a member adjacent to the lower end of the chute and arranged to enter the stringing eye of an element to support such element in position for the action of the operating mechanism.

15. A warp-drawing machine having, in combination, a rotary device arranged to undergo successive revolutions upon its axis, means for inserting a thread-engaging element into said device by movement longitudinally of said element, a needle for drawing a thread through the thread-engaging element while in said device, and means to turn said device to discharge the threaded thread-engaging element.

16. The combination, with a heddle magazine, of means tending to move the heddles out of said magazine; and an escapement comprising a yoke carrying oppositely extending pins adapted to stop the heddles, and means for moving said yoke.

17. The combination, with a heddle magazine having an inclined bottom and an outlet, of friction feed rollers arranged to support the heddles in said magazine; and an escapement at the outlet of the magazine.

18. In a twister, the combination, with two parts having openings therein arranged to register, of a projection on one of said parts, and means for rotating one of said parts.

19. In a twister, the combination, with two parts having openings therein arranged to register, of a projection on one of said parts extending through the opening in the other part, and means for rotating one of said parts.

20. In a twister, the combination, with two parts having openings therein arranged to register, of a projection on one of said parts extending through the opening in the other part; a plush lining on one of said parts; and means for rotating one of said parts with said projection as an axis.

21. In a warp-drawing machine, in combination, a drawing mechanism comprising a needle; means for supporting the reed; and a twister device located rearwardly of the reed, said needle being arranged to carry the drawn-in threads through said twister.

22. In a warp-drawing machine, in combination, two shafts; heddle-handling mechanisms driven from one of said shafts; warp-thread-handling mechanisms driven from the other shaft; and a stop mechanism for stopping one of said shafts without stopping the other shaft.

23. In a warp-drawing machine, in combination, a constantly rotated shaft; warp-thread-handling mechanisms driven from said shaft; an intermittently rotated shaft; heddle-handling mechanisms driven from said last mentioned shaft; and means for disconnecting said intermittently-driven shaft from its source of power.

24. In a warp-drawing machine, in combination, two shafts; heddle-handling mechanisms driven from one of said shafts; warp-thread-handling mechanisms driven from the other shaft; an operative connection between said shafts; and means controlled by the warp threads for breaking said operative connection.

25. In a warp-drawing machine, in combination, a constantly rotated shaft; a pin disk carried by said shaft; a shaft having a star wheel thereon adapted to be alternately rotated and locked against rotation by said pin disk; heddle-handling mechanisms driven from one of said shaft; warp-thread-handling mechanism driven from the other shaft; and means for disengaging said pin disk and said star wheel from each other.

26. In a warp-drawing machine, in combination, a constantly rotated shaft; a pin disk on said shaft; a shaft having a star wheel arranged to be alternately rotated and locked against rotation by said pin disk; warp-thread-handling mechanisms driven from the first mentioned shaft; heddle-handling mechanisms driven from the other shaft; and means for disconnecting said pin disk and said star wheel from each other.

27. The combination, with a shaft carrying a pin disk and a shaft carrying a star wheel arranged to be alternately rotated and locked against rotation by said pin disk, of a stop wheel carried by the second mentioned shaft; means for causing a relative disconnecting movement between said pin disk and said star wheel; and means connected to said pin disk adapted to engage said stop wheel, for holding said pin disk and said star wheel out of operative relation.

28. The combination, with a shaft carrying a pin disk, of a shaft carrying a star wheel arranged to be alternately rotated and locked against rotation by said pin disk; means for causing a relative disconnecting movement between said pin disk and said star wheel; and means for holding said pin disk wheel and said star wheel out of operative relation.

29. The combination, with a shaft carrying a pin disk, of a shaft carrying a star wheel arranged to be driven by said pin disk; a hub on said pin disk wheel carrying a leaf; a stop wheel on the second mentioned shaft having its periphery concaved to receive said hub; and means for causing a relative disconnecting movement between the pin disk and the star wheel, said leaf being arranged to engage said stop wheel to hold the pin disk and the star wheel out of operative relation.

30. A warp-drawing machine having, in combination, a thread-engaging-element feeler adapted to assume three positions, and stop mechanism arranged to be operated by said feeler when in one of said positions.

31. In a machine for operating upon detached warp-thread-engaging-elements, each having an opening therein, in combination, a stop mechanism for the machine; a positioning device for the elements, adapted to engage in said opening; and a member, also adapted to engage in said opening, for controlling said stop mechanism.

32. A warp-drawing machine having, in combination, a feeler arranged to engage the body of a thread-engaging element and also to engage in an opening of such element, and stop mechanism arranged to be operated when the feeler engages the body of the element.

33. A stop mechanism comprising a cam having a stop thereon; a bell crank lever arranged to be moved by said cam, one arm of said bell crank lever being adapted to engage said stop; means tending to move said arm into engagement with said stop; a feeler finger connected to the other arm of said bell crank lever; and a stop means operated by the bodily movement of said bell crank lever.

34. A stop mechanism comprising a cam having a stop thereon; a bell crank lever arranged to be moved by said cam, one arm of said bell crank lever being adapted to engage said stop; a feeler finger connected to the other arm of said bell crank lever; and a stop means operated by the bodily movement of said bell crank lever.

35. In a machine for operating upon detached warp-thread-engaging elements, each having an opening therein, in combination, an operating mechanism; feed rolls for moving said elements longitudinally to said operating mechanism; and a positioning member below said feed rolls and adapted to engage in the opening in said element.

36. In a machine for operating upon detached warp-threaded-engaging elements, each having an opening therein, in combination, an operating mechanism; means for moving an element to said operating mechanism; means engaging in one end of the opening in said elements for suspending said elements in position to be operated upon; and a stop mechanism comprising means adapted to engage in the opposite end of said opening.

37. The combination, with a thread-selecting mechanism, of a stationary fork; a separator mechanism; a fork moving with the separator mechanism and adapted to pass into the other fork when no thread intervenes between the forks; and a stop mechanism operated by said movable fork.

38. In a warp-drawing apparatus, the combination of a heddle hopper, and a heddle-supporting reel arranged in position to carry heddles to the hopper in the rotation of the reel.

39. In a warp-drawing apparatus, the combination of a heddle hopper having a side through which heddles may be introduced into the hopper, and a heddle-supporting reel arranged in position to carry heddles through said side of the hopper in the rotation of the reel.

40. In a warp-drawing apparatus, the combination of a heddle hopper, and a reel comprising heddle-supporting arms pivoted for vertical movement, and means permitting said arms to swing downward when said arms are brought into operative relation with the hopper in the rotation of the reel.

41. A rotatable heddle reel comprising a plurality of pivotally supported arms, and means for supporting said arms against pivotal movement, said means permitting pivotal movement of the arms at a certain point in the rotation of the reel.

42. A harness support comprising a central supporting member and heddle-carrying arms detachably connected to said member.

43. A harness support comprising a central support, and radial heddle-carrying arms mounted for rotation on said support and detachably connected to said support.

44. A thread-engaging-element support comprising a central support and radial thread-engaging-element carrying arms mounted on the central support.

45. A thread-engaging-element support comprising a central support and radial thread-engaging-element carrying arms rotatably mounted on the central support.

46. A warp-drawing machine having, in combination, a thread-engaging-element hopper, and a member movable to place thread-engaging-elements in the hopper.

47. A warp-drawing machine having, in combination, a thread-engaging-element hopper, and a thread-engaging-element supporting bar movable to place a series of thread-engaging elements in the hopper.

48. A warp-drawing machine having, in combination, a thread-engaging-element hopper, and a thread-engaging-element-supporting bar pivoted to carry a series of thread-engaging elements into the hopper.

49. A warp-drawing machine having, in combination, a thread-engaging-element hopper, said hopper having a side wall which is movable to admit thread-engaging elements.

50. A warp-drawing machine having, in combination, a thread-engaging-element hopper having a side which may be opened to admit thread-engaging elements, and a thread-engaging-element-carrying arm movable to carry a series of thread-engaging elements through the side of the hopper.

51. A machine for operating upon warp threads having, in combination, a thread separator, a stationary part against which a separated thread will lie, a movable feeler arranged to engage a separated thread, a spring tending to move said feeler in one direction; means attached to said separator for moving said feeler in the other direction; and a stop means operated by said feeler.

52. A machine for operating upon warp threads having, in combination, a thread selector, a movable member whose movement is arrested by a selected thread, and a stop mechanism arranged to operate when the movement of said member is not arrested.

53. A warp-drawing machine having, in combination, a thread-engaging-element chute, a drawing needle, a device to position a thread-engaging element at the lower end of the chute in position for the operation of the needle, and a rotary device for removing the thread-engaging element from the chute, said rotary device being arranged to undergo complete successive revolutions about its axis in removing successive thread-engaging elements.

54. A warp-drawing machine having, in combination, a drawing needle, a device adapted to engage an eye of a thread-engaging element to suspend said element in position for the passage of the needle, a feeler arranged to engage the body of said thread-engaging element and also arranged to engage in an opening of said element when the latter is in position for the passage of the needle, and stop mechanism arranged to stop the machine when the feeler is in engagement with the body of the element.

55. A warp-drawing machine having, in combination, a thread-engaging-element chute, a gate at the lower end of the chute, to prevent the further descent of such an element, and means to open and close the gate.

56. A warp-drawing machine having, in combination, a thread-engaging-element chute, a gate to open and close the lower end of the chute, thread-engaging-element-feeding means below the gate, and a device below the feeding means to stop a thread-engaging-element in operative position.

57. A warp-drawing machine having, in combination, a thread-engaging-element chute, a gate to open and close the lower end of the chute, and a device below the gate and arranged to project into the stringing eye of thread-engaging-element to support the latter in operative position.

58 A warp-drawing machine having, in combination, a drawing needle, a device arranged to project into the stringing eye of a thread-engaging element to support the latter in position for the operation of the needle, and means to feed thread-engaging elements to said device.

59. A warp-drawing machine having, in combination, a drawing needle, a non-traveling device arranged to engage in an opening of a thread-engaging element to support the latter in position for the operation of the needle, and means to feed thread-engaging elements to said device.

60. The combination, with a thread-engaging-element magazine, of a friction feed roller tending to feed thread-engaging elements from the magazine, and an escapement controlling the discharge of thread-engaging elements from the magazine.

61. A warp-drawing machine having, in combination, a rotary device arranged to undergo successive revolutions upon its axis, means whereby the thread-engaging element may be inserted into said device by movement longitudinally of said element, a needle for drawing a thread through the thread-engaging element while in said device, and means to turn said device to discharge the threaded thread-engaging element.

BURT A. PETERSON.

Witnesses:
C. E. BRIDGE,
H. B. ELMERS.

chute, a gate to open and close the lower end of the chute, thread-engaging-element-feeding means below the gate, and a device below the feeding means to stop a thread-engaging-element in operative position.

57. A warp-drawing machine having, in combination, a thread-engaging-element chute, a gate to open and close the lower end of the chute, and a device below the gate and arranged to project into the stringing eye of thread-engaging-element to support the latter in operative position.

58. A warp-drawing machine having, in combination, a drawing needle, a device arranged to project into the stringing eye of a thread-engaging element to support the latter in position for the operation of the needle, and means to feed thread-engaging elements to said device.

59. A warp-drawing machine having, in combination, a drawing needle, a non-traveling device arranged to engage in an opening of a thread-engaging element to support the latter in position for the operation of the needle, and means to feed thread-engaging elements to said device.

60. The combination, with a thread-engaging-element magazine, of a friction feed roller tending to feed thread-engaging elements from the magazine, and an escapement controlling the discharge of thread-engaging elements from the magazine.

61. A warp-drawing machine having, in combination, a rotary device arranged to undergo successive revolutions upon its axis, means whereby the thread-engaging element may be inserted into said device by movement longitudinally of said element, a needle for drawing a thread through the thread-engaging element while in said device, and means to turn said device to discharge the threaded thread-engaging element.

BURT A. PETERSON.

Witnesses:
C. E. BRIDGE,
H. B. ELMERS.

---

Corrections in Letters Patent No. 1,190,245.

It is hereby certified that in Letters Patent No. 1,190,245, granted July 4, 1916, upon the application of Burt A. Peterson, of Rockford, Illinois, for an improvement in "Warp-Drawing Machines," errors appear in the printed specification requiring correction as follows: Page 4, line 114, for the word "shelf" read *shaft;* page 5, lines 118–119, for the words "separate or" read *separator;* page 10, line 63, claim 28, and line 68, claim 29, strike out the word "wheel"; and that the said Letters Patent should be read with these corrections therein that the same may conform to the record of the case in the Patent Office.

Signed and sealed this 31st day of October, A. D., 1916.

[SEAL.]

Cl. 139—94.

R. F. WHITEHEAD,
*Acting Commissioner of Patents.*

It is hereby certified that in Letters Patent No. 1,190,245, granted July 4, 1916, upon the application of Burt A. Peterson, of Rockford, Illinois, for an improvement in "Warp-Drawing Machines," errors appear in the printed specification requiring correction as follows: Page 4, line 114, for the word "shelf" read *shaft;* page 5, lines 118-119, for the words "separate or" read *separator;* page 10, line 63, claim 28, and line 68, claim 29, strike out the word "wheel"; and that the said Letters Patent should be read with these corrections therein that the same may conform to the record of the case in the Patent Office.

Signed and sealed this 31st day of October, A. D., 1916.

[SEAL.]   R. F. WHITEHEAD,

Cl. 139—94.   *Acting Commissioner of Patents.*